(12) United States Patent
Crabtree et al.

(10) Patent No.: US 12,149,565 B1
(45) Date of Patent: *Nov. 19, 2024

(54) RAPID PREDICTIVE ANALYSIS OF VERY LARGE DATA SETS USING THE DISTRIBUTED COMPUTATIONAL GRAPH

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,027

(22) Filed: Jul. 21, 2024

Related U.S. Application Data

(63) Continuation of application No. 18/581,375, filed on Feb. 20, 2024, which is a continuation of application
(Continued)

(51) Int. Cl.
*G06F 9/50* (2006.01)
*G06F 9/48* (2006.01)
(Continued)

(52) U.S. Cl.
CPC ............ *H04L 63/20* (2013.01); *G06F 9/5038* (2013.01); *G06F 16/2477* (2019.01);
(Continued)

(58) Field of Classification Search
CPC .............................. G06F 9/5038; G06F 9/4881
See application file for complete search history.

(56) References Cited

U.S. PATENT DOCUMENTS 3,370,192 A   2/1968   Schwartz et al.
5,669,000 A   9/1997   Jessen et al.
(Continued)

FOREIGN PATENT DOCUMENTS

CA        2930026 A1     5/2015
WO     2014159150 A1    10/2014
(Continued)

OTHER PUBLICATIONS

Chambers et al. "FlumeJava: easy, efficient data-parallel pipelines." by Chambers, et al. ACM Sigplan Notices 45.6 (2010): 363-375 (Year: 2010).*

Boukhtouta, et al., "Graph-theoretic characterization of cyber-threat infrastructures", Digital Investigation, 2015, vol. 14, p. S3-S15, USA.

(Continued)

*Primary Examiner* — Catherine Thiaw
(74) *Attorney, Agent, or Firm* — Galvin Patent Law LLC; Brian R. Galvin

(57) ABSTRACT

A distributed computing cluster includes first, second, and third pluralities of computer systems. A first computer of the first plurality applies a first transformation pipeline to a stream of data to generate a output data, and transmits the output data to a computer of the second plurality, which is distinct from the first plurality. A second computer of the second plurality applies a second transformation pipeline. The second transformation pipeline includes a first storage transformation. A third computer of the third plurality stores a representation of a distributed computational graph (DCG), which includes a representation of a portion of the second transformation pipeline. The third computer processes the representation of the DCG, and determines whether the second transformation pipeline includes a storage transformation. The third computer monitors the second transformation pipeline, and in response, causes a fourth computer of the third plurality to apply a second storage transformation.

16 Claims, 16 Drawing Sheets

Related U.S. Application Data

No. 17/189,161, filed on Mar. 1, 2021, which is a continuation-in-part of application No. 17/061,195, filed on Oct. 1, 2020, now Pat. No. 11,570,214, which is a continuation-in-part of application No. 17/035,029, filed on Sep. 28, 2020, now Pat. No. 11,546,380, which is a continuation-in-part of application No. 17/008,276, filed on Aug. 31, 2020, now Pat. No. 11,323,484, which is a continuation-in-part of application No. 17/000,504, filed on Aug. 24, 2020, now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, and a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, said application No. 17/189,161 is a continuation-in-part of application No. 16/709,598, filed on Dec. 10, 2019, now Pat. No. 11,507,858, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, said application No. 16/836,717 is a continuation-in-part of application No. 15/887,496, filed on Feb. 2, 2018, now Pat. No. 10,783,241, said application No. 17/061,195 is a continuation-in-part of application No. 15/879,801, filed on Jan. 25, 2018, said application No. 16/248,133 is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, and a continuation-in-part of application No. 15/835,312, filed on Dec. 7, 2017, now Pat. No. 11,055,451, said application No. 16/720,383 is a continuation of application No. 15/823,363, filed on Nov. 27, 2017, now Pat. No. 10,560,483, said application No. 15/887,496 is a continuation-in-part of application No. 15/823,285, filed on Nov. 27, 2017, now Pat. No. 10,740,096, and a continuation-in-part of application No. 15/818,733, filed on Nov. 20, 2017, now Pat. No. 10,673,887, said application No. 16/248,133 is a continuation-in-part of application No. 15/813,097, filed on Nov. 14, 2017, now abandoned, and a continuation-in-part of application No. 15/806,697, filed on Nov. 8, 2017, now abandoned, said application No. 15/835,436 is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, said application No. 15/823,285 is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, said application No. 15/818,733 is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, said application No. 16/248,133 is a continuation-in-part of application No. 15/673,368, filed on Aug. 9, 2017, now abandoned, said application No. 15/725,274 is a continuation-in-part of application No. 15/655,113, filed on Jul. 20, 2017, now Pat. No. 10,735,456, said application No. 15/813,097 is a continuation-in-part of application No. 15/616,427, filed on Jun. 7, 2017, now abandoned, said application No. 15/655,113 is a continuation-in-part of application No. 15/616,427, filed on Jun. 7, 2017, now abandoned, said application No. 15/790,327 is a continuation-in-part of application No. 15/616,427, filed on Jun. 7, 2017, now abandoned, said application No. 15/787,601 is a continuation-in-part of application No. 15/616,427, filed on Jun. 7, 2017, now abandoned, said application No. 15/879,801 is a continuation-in-part of application No. 15/379,899, filed on Dec. 15, 2016, now abandoned, said application No. 15/673,368 is a continuation-in-part of application No. 15/376,657, filed on Dec. 13, 2016, now Pat. No. 10,402,906, said application No. 15/806,697 is a continuation-in-part of application No. 15/376,657, filed on Dec. 13, 2016, now Pat. No. 10,402,906, said application No. 15/379,899 is a continuation-in-part of application No. 15/376,657, filed on Dec. 13, 2016, now Pat. No. 10,402,906, said application No. 15/806,697 is a continuation-in-part of application No. 15/343,209, filed on Nov. 4, 2016, now Pat. No. 11,087,403, said application No. 15/376,657 is a continuation-in-part of application No. 15/237,625, filed on Aug. 15, 2016, now Pat. No. 10,248,910, said application No. 15/655,113 is a continuation-in-part of application No. 15/237,625, filed on Aug. 15, 2016, now Pat. No. 10,248,910, said application No. 15/343,209 is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, which is a continuation-in-part of application No. 15/186,453, filed on Jun. 18, 2016, now abandoned, said application No. 15/835,312 is a continuation-in-part of application No. 15/186,453, filed on Jun. 18, 2016, now abandoned, which is a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, said application No. 16/709,598 is a continuation-in-part of application No. 14/925,974, filed on Oct. 28, 2015, now abandoned, said application No. 15/616,427 is a continuation-in-part of application No. 14/925,974, filed on Oct. 28, 2015, now abandoned, said application No. 15/141,752 is a continuation-in-part of application No. 14/925,974, filed on Oct. 28, 2015, now abandoned.

(60) Provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,291, filed on Oct. 4, 2017, provisional application No. 62/568,307, filed on Oct. 4, 2017.

(51) Int. Cl.
  *G06F 16/2458* (2019.01)
  *G06F 16/951* (2019.01)
  *H04L 9/40* (2022.01)

(52) U.S. Cl.
  CPC ........ *G06F 16/951* (2019.01); *H04L 63/1425* (2013.01); *H04L 63/1441* (2013.01); *G06F 9/4881* (2013.01)

(56) References Cited

U.S. PATENT DOCUMENTS

| | | | |
|---|---|---|---|
| 5,953,011 A | 9/1999 | Matsuoka | |
| 6,256,544 B1 | 7/2001 | Weissinger | |
| 6,477,572 B1 | 11/2002 | Elderton et al. | |
| 6,629,167 B1 * | 9/2003 | Undy | G06F 9/3867 712/E9.046 |
| 6,857,073 B2 | 2/2005 | French et al. | |
| 6,906,709 B1 | 6/2005 | Larkin et al. | |
| 7,072,863 B1 | 7/2006 | Phillips et al. | |
| 7,139,747 B1 | 11/2006 | Najork | |
| 7,171,515 B2 | 1/2007 | Ohta et al. | |
| 7,222,366 B2 | 5/2007 | Bruton, III et al. | |
| 7,227,948 B2 | 6/2007 | Ohkuma et al. | |
| 7,266,821 B2 | 9/2007 | Polizzi et al. | |
| 7,281,125 B2 | 10/2007 | Challener et al. | |
| 7,310,632 B2 | 12/2007 | Meek et al. | |
| 7,373,524 B2 | 5/2008 | Motsinger et al. | |
| 7,437,718 B2 | 10/2008 | Fournet et al. | |
| 7,448,046 B2 | 11/2008 | Navani et al. | |
| 7,480,940 B1 | 1/2009 | Agbabian et al. | |
| 7,493,593 B2 | 2/2009 | Koehler | |
| 7,530,105 B2 | 5/2009 | Gilbert et al. | |
| 7,546,207 B2 | 6/2009 | Nix et al. | |
| 7,546,333 B2 | 6/2009 | Alon et al. | |
| 7,546,637 B1 | 6/2009 | Agbabian et al. | |
| 7,603,709 B2 | 10/2009 | Lewis et al. | |
| 7,603,714 B2 | 10/2009 | Johnson et al. | |
| 7,653,188 B2 | 1/2010 | Kloberdans et al. | |
| 7,657,406 B2 | 2/2010 | Tolone et al. | |
| 7,660,815 B1 | 2/2010 | Scofield et al. | |
| 7,685,296 B2 | 3/2010 | Brill et al. | |
| 7,698,213 B2 | 4/2010 | Lancaster | |
| 7,702,821 B2 | 4/2010 | Feinberg et al. | |
| 7,739,653 B2 | 6/2010 | Venolia | |
| 7,743,421 B2 | 6/2010 | Cosquer et al. | |
| 7,774,335 B1 | 8/2010 | Scofield et al. | |
| 7,818,224 B2 | 10/2010 | Boerner | |
| 7,818,417 B2 | 10/2010 | Ginis et al. | |
| 7,840,677 B2 | 11/2010 | Li et al. | |
| 7,925,561 B2 | 4/2011 | Xu | |
| 7,933,926 B2 | 4/2011 | Ebert | |
| 8,006,303 B1 | 8/2011 | Dennerline et al. | |
| 8,055,712 B2 | 11/2011 | Kagawa et al. | |
| 8,065,257 B2 | 11/2011 | Kuecuekyan | |
| 8,069,190 B2 | 11/2011 | McColl et al. | |
| 8,116,450 B2 | 2/2012 | Agrawal et al. | |
| 8,132,260 B1 | 3/2012 | Mayer et al. | |
| 8,156,029 B2 | 4/2012 | Szydlo | |
| 8,205,259 B2 | 6/2012 | Stute | |
| 8,209,274 B1 | 6/2012 | Lin et al. | |
| 8,245,302 B2 | 8/2012 | Evans et al. | |
| 8,346,753 B2 | 1/2013 | Hayes | |
| 8,352,347 B2 | 1/2013 | Howard et al. | |
| 8,352,412 B2 | 1/2013 | Alba et al. | |
| 8,370,192 B2 | 2/2013 | Deo et al. | |
| 8,380,843 B2 | 2/2013 | Loizeaux et al. | |
| 8,386,519 B2 | 2/2013 | Kenedy et al. | |
| 8,407,800 B2 | 3/2013 | Schlegel et al. | |
| 8,417,656 B2 | 4/2013 | Beg et al. | |
| 8,457,996 B2 | 6/2013 | Winkler et al. | |
| 8,495,521 B2 | 7/2013 | Fried | |
| 8,516,594 B2 | 8/2013 | Bennett et al. | |
| 8,516,596 B2 | 8/2013 | Sandoval et al. | |
| 8,548,777 B2 | 10/2013 | Sturrock et al. | |
| 8,566,945 B2 | 10/2013 | Sima | |
| 8,583,639 B2 | 11/2013 | Chitnis et al. | |
| 8,595,240 B1 | 11/2013 | Otey et al. | |
| 8,601,554 B2 | 12/2013 | Gordon et al. | |
| 8,601,587 B1 | 12/2013 | Powell et al. | |
| 8,607,197 B2 | 12/2013 | Barcia et al. | |
| 8,615,800 B2 | 12/2013 | Baddour et al. | |
| 8,654,127 B2 | 2/2014 | Kenttala et al. | |
| 8,677,473 B2 | 3/2014 | Dennerline et al. | |
| 8,707,275 B2 | 4/2014 | Mascaro et al. | |
| 8,712,596 B2 | 4/2014 | Scott | |
| 8,725,597 B2 | 5/2014 | Mauseth et al. | |
| 8,726,393 B2 | 5/2014 | Macy et al. | |
| 8,751,867 B2 | 6/2014 | Marvasti et al. | |
| 8,752,178 B2 | 6/2014 | Coates et al. | |
| 8,781,990 B1 | 7/2014 | de Alfaro et al. | |
| 8,782,080 B2 | 7/2014 | Lee et al. | |
| 8,788,306 B2 | 7/2014 | Delurgio et al. | |
| 8,793,758 B2 | 7/2014 | Raleigh et al. | |
| 8,806,361 B1 | 8/2014 | Noel et al. | |
| 8,813,234 B1 | 8/2014 | Bowers et al. | |
| 8,819,772 B2 | 8/2014 | Bettini et al. | |
| 8,826,426 B1 | 9/2014 | Dubey | |
| 8,839,440 B2 | 9/2014 | Yun et al. | |
| 8,897,900 B2 | 11/2014 | Smith et al. | |
| 8,898,442 B2 | 11/2014 | Stoitsev | |
| 8,914,878 B2 | 12/2014 | Burns et al. | |
| 8,949,960 B2 | 2/2015 | Berkman et al. | |
| 8,959,494 B2 | 2/2015 | Howard | |
| 8,990,392 B1 | 3/2015 | Stamos | |
| 8,997,233 B2 | 3/2015 | Green et al. | |
| 9,009,837 B2 | 4/2015 | Nunez Di Croce | |
| 9,015,708 B2 | 4/2015 | Choudhury et al. | |
| 9,021,477 B2 | 4/2015 | Choudhury et al. | |
| 9,031,870 B2 | 5/2015 | Kenedy et al. | |
| 9,043,332 B2 | 5/2015 | Noel et al. | |
| 9,049,207 B2 | 6/2015 | Hugard, IV et al. | |
| 9,069,725 B2 | 6/2015 | Jones | |
| 9,092,616 B2 | 7/2015 | Kumar et al. | |
| 9,100,430 B1 | 8/2015 | Seiver et al. | |
| 9,110,706 B2 | 8/2015 | Yu et al. | |
| 9,129,108 B2 | 9/2015 | Drissi et al. | |
| 9,134,966 B2 | 9/2015 | Brock et al. | |
| 9,137,024 B2 | 9/2015 | Swingler et al. | |
| 9,152,727 B1 | 10/2015 | Balducci et al. | |
| 9,166,990 B2 | 10/2015 | Eswaran et al. | |
| 9,171,079 B2 | 10/2015 | Banka et al. | |
| 9,185,124 B2 | 11/2015 | Chakraborty | |
| 9,202,040 B2 | 12/2015 | Rosenblatt et al. | |
| 9,203,827 B2 | 12/2015 | Srinivasan et al. | |
| 9,210,185 B1 | 12/2015 | Pinney Wood et al. | |
| 9,231,962 B1 | 1/2016 | Yen et al. | |
| 9,235,732 B2 | 1/2016 | Eynon et al. | |
| 9,253,643 B2 | 2/2016 | Pattar et al. | |
| 9,256,735 B2 | 2/2016 | Stute | |
| 9,262,787 B2 | 2/2016 | Binion et al. | |
| 9,264,395 B1 | 2/2016 | Stamos | |
| 9,276,951 B2 | 3/2016 | Choi et al. | |
| 9,286,103 B2 | 3/2016 | Acharya et al. | |
| 9,292,692 B2 | 3/2016 | Wallrabenstein | |
| 9,292,699 B1 | 3/2016 | Stuntebeck et al. | |
| 9,294,498 B1 | 3/2016 | Yampolskiy et al. | |

(56) References Cited

U.S. PATENT DOCUMENTS

| | | | |
|---|---|---|---|
| 9,300,682 | B2 | 3/2016 | Burnham et al. |
| 9,319,430 | B2 | 4/2016 | Bell, Jr. et al. |
| 9,336,481 | B1 | 5/2016 | Ionson |
| 9,338,061 | B2 | 5/2016 | Chen et al. |
| 9,344,444 | B2 | 5/2016 | Lippmann et al. |
| 9,348,602 | B1 * | 5/2016 | Alapati .................. H04L 67/01 |
| 9,349,103 | B2 | 5/2016 | Eberhardt, III et al. |
| 9,369,482 | B2 | 6/2016 | Borohovski et al. |
| 9,384,345 | B2 | 7/2016 | Dixon et al. |
| 9,390,376 | B2 | 7/2016 | Harrison et al. |
| 9,400,962 | B2 | 7/2016 | Prasad |
| 9,438,616 | B2 | 9/2016 | Singla et al. |
| 9,461,876 | B2 | 10/2016 | Van Dusen et al. |
| 9,466,041 | B2 | 10/2016 | Simitsis et al. |
| 9,467,461 | B2 | 10/2016 | Balderas |
| 9,479,720 | B1 * | 10/2016 | Hegar .................. H04L 65/765 |
| 9,495,188 | B1 | 11/2016 | Ettema et al. |
| 9,501,647 | B2 | 11/2016 | Yampolskiy et al. |
| 9,503,467 | B2 | 11/2016 | Lefebvre et al. |
| 9,503,472 | B2 | 11/2016 | Laidlaw et al. |
| 9,509,716 | B2 | 11/2016 | Shabtai et al. |
| 9,515,826 | B2 | 12/2016 | Whelan et al. |
| 9,516,053 | B1 | 12/2016 | Muddu et al. |
| 9,521,166 | B2 | 12/2016 | Wilson |
| 9,541,982 | B2 | 1/2017 | Lipasti et al. |
| 9,558,220 | B2 | 1/2017 | Nixon et al. |
| 9,560,065 | B2 | 1/2017 | Neil et al. |
| 9,565,204 | B2 | 2/2017 | Chesla |
| 9,571,517 | B2 | 2/2017 | Vallone et al. |
| 9,578,046 | B2 | 2/2017 | Baker |
| 9,596,141 | B2 | 3/2017 | McDowall |
| 9,600,792 | B2 | 3/2017 | Foehr et al. |
| 9,602,513 | B2 | 3/2017 | Gamage et al. |
| 9,602,529 | B2 | 3/2017 | Jones et al. |
| 9,602,530 | B2 | 3/2017 | Ellis et al. |
| 9,609,009 | B2 | 3/2017 | Muddu et al. |
| 9,609,015 | B2 | 3/2017 | Natarajan et al. |
| 9,619,291 | B2 | 4/2017 | Pueyo et al. |
| 9,639,575 | B2 | 5/2017 | Leida et al. |
| 9,652,538 | B2 | 5/2017 | Shivaswamy et al. |
| 9,652,604 | B1 | 5/2017 | Johansson et al. |
| 9,654,495 | B2 | 5/2017 | Hubbard et al. |
| 9,661,019 | B2 | 5/2017 | Liu |
| 9,667,600 | B2 | 5/2017 | Piqueras Jover et al. |
| 9,667,641 | B2 | 5/2017 | Muddu et al. |
| 9,672,283 | B2 | 6/2017 | Pappas et al. |
| 9,672,355 | B2 | 6/2017 | Titonis et al. |
| 9,674,211 | B2 | 6/2017 | Curcic et al. |
| 9,674,249 | B1 | 6/2017 | Kekre et al. |
| 9,679,125 | B2 | 6/2017 | Bailor et al. |
| 9,680,867 | B2 | 6/2017 | Hughes et al. |
| 9,686,293 | B2 | 6/2017 | Golshan et al. |
| 9,690,645 | B2 | 6/2017 | Samuni et al. |
| 9,699,205 | B2 | 7/2017 | Muddu et al. |
| 9,712,553 | B2 | 7/2017 | Nguyen et al. |
| 9,721,086 | B2 | 8/2017 | Shear et al. |
| 9,729,421 | B2 | 8/2017 | Brech et al. |
| 9,729,538 | B2 | 8/2017 | Plotnik et al. |
| 9,734,169 | B2 | 8/2017 | Redlich et al. |
| 9,734,220 | B2 | 8/2017 | Karpištšenko et al. |
| 9,736,173 | B2 | 8/2017 | Li et al. |
| 9,749,343 | B2 | 8/2017 | Watters et al. |
| 9,749,344 | B2 | 8/2017 | Watters et al. |
| 9,753,796 | B2 | 9/2017 | Mahaffey et al. |
| 9,756,067 | B2 | 9/2017 | Boyadjiev et al. |
| 9,762,443 | B2 | 9/2017 | Dickey |
| 9,771,225 | B2 | 9/2017 | Stone et al. |
| 9,772,934 | B2 | 9/2017 | Maag et al. |
| 9,774,407 | B2 | 9/2017 | Hudson et al. |
| 9,774,522 | B2 | 9/2017 | Vasseur et al. |
| 9,774,616 | B2 | 9/2017 | Flores et al. |
| 9,781,144 | B1 | 10/2017 | Otvagin et al. |
| 9,807,104 | B1 | 10/2017 | Sarra |
| 9,832,213 | B2 | 11/2017 | Underwood et al. |
| 9,842,000 | B2 | 12/2017 | Bishop et al. |
| 9,858,322 | B2 | 1/2018 | Theimer et al. |
| 9,860,208 | B1 | 1/2018 | Ettema et al. |
| 9,875,360 | B1 | 1/2018 | Grossman et al. |
| 9,882,929 | B1 | 1/2018 | Ettema et al. |
| 9,886,273 | B1 * | 2/2018 | Eldar ..................... G06F 15/80 |
| 9,887,933 | B2 | 2/2018 | Lawrence, III |
| 9,910,993 | B2 | 3/2018 | Grossman et al. |
| 9,911,088 | B2 | 3/2018 | Nath et al. |
| 9,917,860 | B2 | 3/2018 | Senanayake et al. |
| 9,928,366 | B2 | 3/2018 | Ladnai et al. |
| 9,930,058 | B2 | 3/2018 | Carpenter et al. |
| 9,942,295 | B2 | 4/2018 | Rider et al. |
| 9,946,517 | B2 | 4/2018 | Talby et al. |
| 9,952,899 | B2 | 4/2018 | Novaes |
| 9,954,879 | B1 | 4/2018 | Sadaghiani et al. |
| 9,954,884 | B2 | 4/2018 | Hassell et al. |
| 9,965,627 | B2 | 5/2018 | Ray et al. |
| 9,967,264 | B2 | 5/2018 | Harris et al. |
| 9,967,265 | B1 | 5/2018 | Peer et al. |
| 9,967,282 | B2 | 5/2018 | Thomas et al. |
| 9,967,283 | B2 | 5/2018 | Ray et al. |
| 9,967,625 | B2 | 5/2018 | Korst et al. |
| 9,984,129 | B2 | 5/2018 | Patel et al. |
| 9,992,228 | B2 | 6/2018 | Ray et al. |
| 10,009,378 | B2 | 6/2018 | Chiviendacz et al. |
| 10,027,711 | B2 | 7/2018 | Gill et al. |
| 10,038,559 | B2 | 7/2018 | Burrows et al. |
| 10,044,675 | B1 | 8/2018 | Ettema et al. |
| 10,050,985 | B2 | 8/2018 | Mhatre et al. |
| 10,055,473 | B2 | 8/2018 | Allen et al. |
| 10,061,635 | B2 | 8/2018 | Ellwein |
| 10,074,052 | B2 | 9/2018 | Banerjee et al. |
| 10,078,664 | B2 | 9/2018 | Gustafson et al. |
| 10,083,236 | B2 | 9/2018 | Crosby |
| 10,102,480 | B2 | 10/2018 | Dirac et al. |
| 10,108,907 | B2 | 10/2018 | Bugay et al. |
| 10,109,014 | B1 | 10/2018 | Bischoff et al. |
| 10,110,415 | B2 | 10/2018 | Radivojevic et al. |
| 10,120,907 | B2 | 11/2018 | de Castro Alves et al. |
| 10,122,687 | B2 | 11/2018 | Thomas et al. |
| 10,122,764 | B1 | 11/2018 | Obaidi |
| 10,146,592 | B2 | 12/2018 | Bishop et al. |
| 10,152,676 | B1 | 12/2018 | Strom |
| 10,154,049 | B2 | 12/2018 | Sancheti et al. |
| 10,162,969 | B2 | 12/2018 | Knapp |
| 10,168,691 | B2 | 1/2019 | Zornio et al. |
| 10,180,780 | B2 | 1/2019 | Ainalem |
| 10,185,832 | B2 | 1/2019 | Cam |
| 10,191,768 | B2 | 1/2019 | Bishop et al. |
| 10,205,735 | B2 | 2/2019 | Apostolopoulos |
| 10,210,246 | B2 | 2/2019 | Stojanovic et al. |
| 10,210,470 | B2 | 2/2019 | Ray |
| 10,212,176 | B2 | 2/2019 | Wang |
| 10,212,184 | B2 | 2/2019 | Sweeney et al. |
| 10,216,485 | B2 | 2/2019 | Misra et al. |
| 10,217,348 | B2 | 2/2019 | Poder et al. |
| 10,261,763 | B2 | 4/2019 | Fink et al. |
| 10,275,545 | B2 | 4/2019 | Yeager et al. |
| 10,277,629 | B1 | 4/2019 | Guntur |
| 10,284,570 | B2 | 5/2019 | Schmidtler et al. |
| 10,289,841 | B2 | 5/2019 | Tang et al. |
| 10,290,141 | B2 | 5/2019 | Kennedy et al. |
| 10,298,607 | B2 | 5/2019 | Tang et al. |
| 10,305,902 | B2 | 5/2019 | Kim |
| 10,318,739 | B2 | 6/2019 | Brucker et al. |
| 10,318,882 | B2 | 6/2019 | Brueckner et al. |
| 10,320,828 | B1 | 6/2019 | Derbeko et al. |
| 10,321,278 | B2 | 6/2019 | Proctor |
| 10,324,773 | B2 | 6/2019 | Wing et al. |
| 10,338,913 | B2 | 7/2019 | Franchitti |
| 10,367,829 | B2 | 7/2019 | Huang et al. |
| 10,380,140 | B2 | 8/2019 | Sherman |
| 10,387,124 | B2 | 8/2019 | Chaudhuri et al. |
| 10,387,631 | B2 | 8/2019 | Duggal et al. |
| 10,410,113 | B2 | 9/2019 | Clayton et al. |
| 10,410,214 | B2 | 9/2019 | Doyle |
| 10,438,001 | B1 | 10/2019 | Hariprasad |
| 10,440,054 | B2 | 10/2019 | Robertson |
| 10,445,482 | B2 | 10/2019 | Ren |

(56) References Cited

U.S. PATENT DOCUMENTS

| | | |
|---|---|---|
| 10,452,664 B2 | 10/2019 | Le Mouel et al. |
| 10,462,112 B1 | 10/2019 | Makmel et al. |
| 10,505,954 B2 | 12/2019 | Stokes, III et al. |
| 10,511,498 B1 | 12/2019 | Narayan et al. |
| 10,515,062 B2 | 12/2019 | Tidwell et al. |
| 10,515,366 B1 | 12/2019 | Gorelik et al. |
| 10,530,796 B2 | 1/2020 | Patterson et al. |
| 10,540,624 B2 | 1/2020 | Hui et al. |
| 10,579,691 B2 | 3/2020 | Levine et al. |
| 10,601,854 B2 | 3/2020 | Lokamathe et al. |
| 10,606,454 B2 | 3/2020 | Pani |
| 10,609,059 B2 | 3/2020 | Apostolopoulos |
| 10,628,578 B2 | 4/2020 | Eksten et al. |
| 10,643,144 B2 | 5/2020 | Bowers et al. |
| 10,645,086 B1 | 5/2020 | Hadler |
| 10,645,100 B1 | 5/2020 | Wang et al. |
| 10,673,880 B1 | 6/2020 | Pratt et al. |
| 10,715,534 B2 | 7/2020 | Sander et al. |
| 10,740,358 B2 | 8/2020 | Chan et al. |
| 10,764,321 B2 | 9/2020 | Bower, III et al. |
| 10,776,847 B1 | 9/2020 | Comar et al. |
| 10,789,367 B2 | 9/2020 | Joseph Durairaj et al. |
| 10,791,131 B2 | 9/2020 | Nor et al. |
| 10,817,530 B2 | 10/2020 | Siebel et al. |
| 10,861,028 B2 | 12/2020 | Silberman et al. |
| 10,862,916 B2 | 12/2020 | Hittel et al. |
| 10,871,951 B2 | 12/2020 | Ding et al. |
| 10,911,470 B2 | 2/2021 | Muddu et al. |
| 10,944,772 B2 | 3/2021 | Mulchandani et al. |
| 10,958,667 B1 | 3/2021 | Maida et al. |
| 10,965,711 B2 | 3/2021 | Schiappa et al. |
| 10,977,551 B2 | 4/2021 | Van Seijen et al. |
| 10,985,997 B2 | 4/2021 | Duggal et al. |
| 10,992,698 B2 | 4/2021 | Patel et al. |
| 11,030,520 B2 | 6/2021 | Mankovskii et al. |
| 11,032,307 B2 | 6/2021 | Tsironis |
| 11,113,667 B1 | 9/2021 | Jiang et al. |
| 11,138,514 B2 | 10/2021 | Hu et al. |
| 11,194,900 B2 | 12/2021 | Loman et al. |
| 11,256,791 B2 | 2/2022 | Douglas et al. |
| 11,334,831 B2 | 5/2022 | Abu El Ata et al. |
| 11,392,875 B2 | 7/2022 | Carstens et al. |
| 11,477,641 B2 | 10/2022 | Damlaj et al. |
| 11,539,663 B2 | 12/2022 | Chasman et al. |
| 11,574,206 B2 | 2/2023 | Butler, Jr. et al. |
| 11,736,299 B2 | 8/2023 | Cerna, Jr. |
| 2004/0255167 A1 | 12/2004 | Knight |
| 2005/0071223 A1 | 3/2005 | Jain et al. |
| 2005/0165822 A1 | 7/2005 | Yeung et al. |
| 2005/0198099 A1 | 9/2005 | Motsinger et al. |
| 2005/0289072 A1 | 12/2005 | Sabharwal |
| 2006/0149575 A1 | 7/2006 | Varadarajan et al. |
| 2007/0055558 A1 | 3/2007 | Shanahan et al. |
| 2007/0136821 A1 | 6/2007 | Hershaft et al. |
| 2007/0150744 A1 | 6/2007 | Cheng et al. |
| 2007/0168370 A1 | 7/2007 | Hardy |
| 2007/0276714 A1 | 11/2007 | Beringer |
| 2008/0021866 A1 | 1/2008 | Hinton et al. |
| 2008/0270203 A1 | 10/2008 | Holmes et al. |
| 2009/0012760 A1 | 1/2009 | Schunemann |
| 2009/0094372 A1 | 4/2009 | Nyang et al. |
| 2009/0199002 A1 | 8/2009 | Erickson |
| 2009/0319247 A1 | 12/2009 | Ratcliffe, III et al. |
| 2009/0327668 A1* | 12/2009 | Sudzilouski .......... G06F 9/5038 712/225 |
| 2010/0083240 A1 | 4/2010 | Siman |
| 2010/0115276 A1 | 5/2010 | Betouin et al. |
| 2010/0275183 A1 | 10/2010 | Panicker et al. |
| 2010/0299651 A1 | 11/2010 | Fainekos et al. |
| 2010/0325685 A1 | 12/2010 | Sanbower |
| 2011/0087888 A1 | 4/2011 | Rennie |
| 2011/0225287 A1 | 9/2011 | Dalal et al. |
| 2011/0307467 A1 | 12/2011 | Severance |
| 2012/0215575 A1 | 8/2012 | Deb et al. |
| 2012/0296845 A1 | 11/2012 | Andrews et al. |
| 2013/0046751 A1 | 2/2013 | Tsiatsis et al. |
| 2013/0067558 A1* | 3/2013 | Markham ............ H04L 63/1425 726/11 |
| 2013/0073573 A1* | 3/2013 | Huang .................. G06F 16/254 707/774 |
| 2013/0117831 A1 | 5/2013 | Hook et al. |
| 2013/0132149 A1 | 5/2013 | Wei et al. |
| 2013/0159219 A1 | 6/2013 | Pantel et al. |
| 2014/0082729 A1 | 3/2014 | Shim et al. |
| 2014/0149186 A1 | 5/2014 | Flaxer et al. |
| 2014/0244612 A1 | 8/2014 | Bhasin et al. |
| 2014/0279762 A1 | 9/2014 | Xaypanya et al. |
| 2014/0324521 A1 | 10/2014 | Mun |
| 2014/0351827 A1* | 11/2014 | Llamas ................. G06F 9/4881 718/107 |
| 2015/0081363 A1 | 3/2015 | Taylor et al. |
| 2015/0128258 A1 | 5/2015 | Novozhenets |
| 2015/0149979 A1 | 5/2015 | Talby et al. |
| 2015/0161738 A1 | 6/2015 | Stempora |
| 2015/0170053 A1 | 6/2015 | Miao |
| 2015/0172311 A1 | 6/2015 | Freedman et al. |
| 2015/0242509 A1 | 8/2015 | Pall et al. |
| 2015/0261580 A1* | 9/2015 | Shau .................... H04L 67/1001 718/106 |
| 2015/0281225 A1 | 10/2015 | Schoen et al. |
| 2015/0295775 A1 | 10/2015 | Dickey |
| 2015/0317745 A1 | 11/2015 | Collins et al. |
| 2015/0347414 A1 | 12/2015 | Xiao et al. |
| 2015/0379111 A1 | 12/2015 | Hwang |
| 2016/0004858 A1 | 1/2016 | Chen et al. |
| 2016/0006629 A1 | 1/2016 | Tanakiev et al. |
| 2016/0012235 A1 | 1/2016 | Lee et al. |
| 2016/0057159 A1 | 2/2016 | Yin et al. |
| 2016/0088000 A1 | 3/2016 | Siva Kumar et al. |
| 2016/0099960 A1 | 4/2016 | Gerritz et al. |
| 2016/0119365 A1 | 4/2016 | Barel |
| 2016/0140519 A1 | 5/2016 | Trepca et al. |
| 2016/0180240 A1 | 6/2016 | Majumdar et al. |
| 2016/0219066 A1 | 7/2016 | Vasseur et al. |
| 2016/0275123 A1* | 9/2016 | Lin ....................... G06F 9/5083 |
| 2016/0323216 A1* | 11/2016 | LeVasseur ............ H04L 51/212 |
| 2016/0330233 A1 | 11/2016 | Hart |
| 2016/0364307 A1 | 12/2016 | Garg et al. |
| 2016/0371363 A1 | 12/2016 | Muro et al. |
| 2017/0010589 A1 | 1/2017 | de Anda Fast |
| 2017/0023509 A1 | 1/2017 | Kim et al. |
| 2017/0090893 A1 | 3/2017 | Aditya et al. |
| 2017/0207926 A1 | 7/2017 | Gil et al. |
| 2017/0241791 A1 | 8/2017 | Madigan et al. |
| 2018/0268264 A1 | 9/2018 | Marwah et al. |
| 2018/0336250 A1 | 11/2018 | Llaves et al. |
| 2019/0188797 A1 | 6/2019 | Przechocki et al. |
| 2020/0004752 A1 | 1/2020 | Majumdar et al. |
| 2020/0177618 A1 | 6/2020 | Hassanzadeh et al. |
| 2020/0304534 A1 | 9/2020 | Rakesh et al. |
| 2020/0356664 A1 | 11/2020 | Maor |
| 2020/0364346 A1 | 11/2020 | Gourisetti et al. |
| 2020/0396246 A1 | 12/2020 | Zoldi et al. |
| 2021/0075822 A1 | 3/2021 | Chung et al. |

FOREIGN PATENT DOCUMENTS

| | | |
|---|---|---|
| WO | 2015089463 A1 | 6/2015 |
| WO | 2020079685 A1 | 4/2020 |

OTHER PUBLICATIONS

Cui, et al., "Non-intrusive process-based monitoring system to mitigate and prevent VM vulnerability explorations", Collaboratecom, 2013, Austin, USA.

Ekelhart, et al., "Integrating attacker behavior in IT security analysis: a discrete-event simulation approach", ResearchGate, 2015.

Fisk, Varghese, "Agile and Scalable Analysis of Network Events".

Gedik et al., "Elastic Scaling for Data Stream Processing", IEEE Transactions on Parallel and Distributed Systems, Jun. 2014, vol. 25, No. 6, p. 1447-1463.

Jajodia, et al., "Advanced Cyber Attack Modeling, Analysis, and Visualization", AFRL Final Technical Report, Mar. 2010, USA.

(56) References Cited

OTHER PUBLICATIONS

JPCERT-CC, "Detecting Lateral Movement through Tracking Event Logs (Version 2)", 2017, p. 1-16, Japan.

Jungles et al., "Mitigating Pass-the-Hash (PtH) Attacks and Other Credential Theft Techniques", TwC Next, 2012.

Kbar, "Wireless Network Token-Based Fast Authentication", 17th International Conference on Telecommunications, 2010, p. 227-233.

Kiesling et al., "Selecting security control portfolios: a multi-objective simulation-optimization approach", EURO Journal on Decision Processes, Apr. 2016.

Kotenko, "A Cyber Attack Modeling and Impact Assessment framework", Conference Paper, Jan. 2013.

Kumar, et al., "DFuse: A Framework for Distributed Data Fusion", Georgia Institute of Technology.

Lu, et al., "Sybil Attack Detection through Global Topology Pattern Visualization", 2011.

Pasqualetti et al., "Attack Detection and Identification in Cyber-Physical Systems", IEEE Transactions on Automatic Control, vol. 58, No. 11, p. 2715-2729.

Patapanchala, "Exploring Security Metrics for Electric Grid Infrastructure Leveraging Attack Graphs", Oregon State Thesis, 2016.

Shandilya et al., "Use of Attack Graphs in Security Systems", Journal of Computer Networks and Communications, vol. 2014.

Yang et al., "Attack Projection", Advances in Information Security 62, 2014, p. 239-261.

Zargar et al., "XABA: A Zero-Knowledge Anomaly-Based Behavioral Analysis Method to Detect Insider Threats", 2016.

Excerpts of raw documentation source located in the Apache Logging Flume GitHub "apache/logging-flume" repository tagged as Apache Flume Release 1.6.0, dated May 5, 2015, full release available at https://github.com/apache/logging-flume/tree/release-1.6.0, 200 pages.

Excerpts of raw documentation source located in the Apache Airflow GitHub "apache/airflow" repository tagged as Apache Airflow Release v1.5.1, dated Sep. 4, 2015, full release available at https://github.com/apache/airflow/tree/1.5.1, 75 pages.

Excerpts of raw documentation source located in the Apache Apex core GitHub "apache/apex-core" repository tagged as Apache Apex Core Release v3.1.1, dated Oct. 8, 2015, full release available at https://github.com/apache/apex-core/tree/v3.1.1, 158 pages.

Excerpts of raw documentation source located in the Apache Beam GitHub "apache/beam" repository tagged as Apache Beam Release v1.2.0, dated Oct. 5, 2015, full release available at https://github.com/apache/beam/tree/v1.2.0, 31 pages.

Excerpts of raw documentation source located in the Apache Flink GitHub "apache/flink" repository tagged as Apache Flink Release 0.9.7, dated Aug. 27, 2015, full release available at https://github.com/apache/flink/tree/release-0.9.1, 712 pages.

Excerpts of raw documentation source located in the Apache Hadoop GiHub "apache/hadoop" repository tagged as Apache Hadoop Release 2.6.1, dated Sep. 23, 2015, full release available at https://github.com/apache/hadoop/tree/release-2.6.1, 1640 pages.

Excerpts of raw documentation source located in the Apache Ignite GitHub "apache/ignite" repository tagged as Apache Ignite Release 1.4.1, dated Sep. 25, 2015, full release available at https://github.com/apache/ignite/tree/1.4.1, 103 pages.

Excerpts of raw documentation source located in the Apache Kafka GitHub "apache/kafka" repository tagged as Apache Kafka Release 0.8.2.2, dated Sep. 2, 2015, full release available at https://github.com/apache/kafka/tree/0.8.2.2, 13 pages.

Excerpts of raw documentation source located in the Apache NiFi GitHub "apache/nifi" repository tagged as Apache NiFi Release nifi-0.3.0-RC1, dated Sep. 14, 2015, full release available at https://github.com/apache/nifi/tree/nifi-0.3.0-RC1, 286 pages.

Excerpts of raw documentation source located in the Apache Samza GitHub "apache/samza" repository tagged as Apache Samza Release 0.9.1-rc1, date Jun. 23, 2015, full release available at https://github.com/apache/samza/tree/release-0.9.1-rc1, 221 pages.

Excerpts of raw documentation source located in the Apache Spark GitHub "apache/spark" repository tagged as Apache Spark Release v. 15.1-rc1, dated Sep. 23, 2015, full release available at https://github.com/apache/spark/tree/v1.5.1, 2122 pages.

Excerpts of raw documentation source located in the Apache Storm GitHub "apache/storm" repository tagged as Apache Storm Release v0. 10.0-beta1, dated Jun. 19, 2015, full release available at https://github.com/apache/storm/tree/v0. 10.0-beta1, 589 pages.

\* cited by examiner

RAPID PREDICTIVE ANALYSIS OF VERY LARGE DATA SETS USING THE DISTRIBUTED COMPUTATIONAL GRAPH

CROSS-REFERENCE TO RELATED APPLICATIONS

This application is a continuation of U.S. patent application Ser. No. 18/581,375, filed Feb. 20, 2024; which is a continuation of U.S. patent application Ser. No. 17/189,161, filed Mar. 1, 2021; which is a continuation-in-part of U.S. patent application Ser. No. 17/061,195, filed Oct. 1, 2020, now issued as U.S. Pat. No. 11,570,214 on Jan. 31, 2023; which is a continuation-in-part of U.S. patent application Ser. No. 17/035,029, filed Sep. 28, 2020, now issued as U.S. Pat. No. 11,546,380 on Jan. 3, 2023; which is a continuation-in-part of U.S. patent application Ser. No. 17/008,276, filed Aug. 31, 2020, now issued as U.S. Pat. No. 11,323,484 on May 3, 2022; which is a continuation-in-part of U.S. patent application Ser. No. 17/000,504, filed Aug. 24, 2020, now issued as U.S. Pat. No. 11,477,245 on Oct. 18, 2022; which is a continuation-in-part of U.S. patent application Ser. No. 16/855,724, filed on Apr. 22, 2020, now issued as U.S. Pat. No. 11,218,510 on Jan. 4, 2022; which is a continuation-in-part of U.S. patent application Ser. No. 16/836,717, filed on Mar. 31, 2020, now issued as U.S. Pat. No. 10,917,428 on Feb. 9, 2021; which is a continuation-in-part of U.S. patent application Ser. No. 15/887,496, filed Feb. 2, 2018, now issued as U.S. Pat. No. 10,783,241 on Sep. 22, 2020; which is a continuation-in-part of U.S. patent application Ser. No. 15/823,285, filed Nov. 27, 2017, now issued as U.S. Pat. No. 10,740,096 on Aug. 11, 2020; which is a continuation-in-part of U.S. patent application Ser. No. 15/788,718, filed Oct. 19, 2017, now issued as U.S. Pat. No. 10,861,014 on Dec. 8, 2020; which is a continuation-in-part of U.S. patent application Ser. No. 15/788,002, filed on Oct. 19, 2017; which is a continuation-in-part of U.S. patent application Ser. No. 15/787,601, filed on Oct. 18, 2017, now issued as U.S. Pat. No. 10,860,660 on Dec. 8, 2020; which claims the benefit of U.S. Provisional Pat. App. No. 62/568,312, filed on Oct. 4, 2017; said application Ser. No. 15/787,601 is a continuation-in-part of U.S. patent application Ser. No. 15/616,427, filed on Jun. 7, 2017; which is a continuation-in-part of U.S. patent application Ser. No. 14/925,974 (which is explicitly incorporated by reference in its entirety herein), filed Oct. 28, 2015; said application Ser. No. 15/788,002 claims the benefit of U.S. Provisional Pat. App. No. 62/568,305, filed Oct. 4, 2017; said application Ser. No. 15/788,718 claims the benefit of U.S. Provisional Pat. App. No. 62/568,307, filed Oct. 4, 2017; said application Ser. No. 15/887,496 is a continuation-in-part of U.S. patent application Ser. No. 15/818,733, filed Nov. 20, 2017, now issued as U.S. Pat. No. 10,673,887 on Jun. 2, 2020; which is a continuation-in-part of U.S. patent application Ser. No. 15/725,274, filed Oct. 4, 2017, now issued as U.S. Pat. No. 10,609,079 on Mar. 31, 2020; which is a continuation-in-part of U.S. patent application Ser. No. 15/655,113, filed Jul. 20, 2017, now issued as U.S. Pat. No. 10,735,456 on Aug. 4, 2020; which is a continuation-in-part of U.S. patent application Ser. No. 15/616,427, filed Jun. 7, 2017; said application Ser. No. 15/655,113 is a continuation-in-part of U.S. patent application Ser. No. 15/237,625, filed Aug. 15, 2016, now issued as U.S. Pat. No. 10,248,910 on Apr. 2, 2019; which is a continuation-in-part of U.S. patent application Ser. No. 15/206,195, filed Jul. 8, 2016; which is a continuation-in-part of U.S. patent application Ser. No. 15/186,453, filed Jun. 18, 2016; which is a continuation-in-part of U.S. patent application Ser. No. 15/166,158, filed May 26, 2016; which is a continuation-in-part of U.S. patent application Ser. No. 15/141,752, filed Apr. 28, 2016, now issued as U.S. Pat. No. 10,860,962 on Dec. 8, 2020; which is a continuation-in-part of U.S. patent application Ser. No. 15/091,563, filed Apr. 5, 2016, now issued as U.S. Pat. No. 10,204,147 on Feb. 12, 2019; said application Ser. No. 15/141,752 is a continuation-in-part of U.S. patent application Ser. No. 14/986,536, filed Dec. 31, 2015, now issued as U.S. Pat. No. 10,210,255 on Feb. 19, 2019; said application Ser. No. 15/141,752 is a continuation-in-part of U.S. patent application Ser. No. 14/925,974, filed Oct. 28, 2015; said application Ser. No. 16/855,724 is a continuation-in-part of U.S. patent application Ser. No. 16/777,270, filed Jan. 30, 2020, now issued as U.S. Pat. No. 11,025,674 on Jun. 1, 2021; which is a continuation-in-part of U.S. patent application Ser. No. 16/720,383, filed Dec. 19, 2019, now issued as U.S. Pat. No. 10,944,795 on Mar. 9, 2021; which is a continuation of U.S. patent application Ser. No. 15/823,363, filed Nov. 27, 2017, now issued as U.S. Pat. No. 10,560,483 on Feb. 11, 2020; which is a continuation-in-part of U.S. patent application Ser. No. 15/725,274, filed Oct. 4, 2017, now issued as U.S. Pat. No. 10,609,079 on Mar. 31, 2020; said application Ser. No. 17/000,504 is a continuation-in-part of U.S. patent application Ser. No. 16/412,340, filed May 14, 2019, now issued as U.S. Pat. No. 11,539,663 on Dec. 27, 2022; which is a continuation-in-part of U.S. patent application Ser. No. 16/267,893, filed Feb. 5, 2019; which is a continuation-in-part of U.S. patent application Ser. No. 16/248,133, filed Jan. 15, 2019; which is a continuation-in-part of U.S. patent application Ser. No. 15/849,901, filed Dec. 21, 2017, now issued as U.S. Pat. No. 11,023,284 on Jun. 1, 2021; which is a continuation-in-part of U.S. patent application Ser. No. 15/835,436, filed Dec. 17, 2017, now issued as U.S. Pat. No. 10,572,828 on Feb. 5, 2020; which is a continuation-in-part of U.S. patent application Ser. No. 15/790,457, filed Oct. 23, 2017, now issued as U.S. Pat. No. 10,884,999 on Jan. 5, 2021; which is a continuation-in-part of U.S. patent application Ser. No. 15/790,327, filed on Oct. 23, 2017, now issued as U.S. Pat. No. 10,860,951 on Dec. 8, 2020; which claims the benefit of U.S. Provisional Pat. App. No. 62/568,291, filed Oct. 4, 2017; said application Ser. No. 15/790,327 is a continuation-in-part of U.S. patent application Ser. No. 15/616,427, filed Jun. 7, 2017; said application Ser. No. 15/790,327 is a continuation-in-part of U.S. patent application Ser. No. 15/141,752, filed Apr. 28, 2016, now issued as U.S. Pat. No. 10,860,962 on Dec. 8, 2020; said application Ser. No. 15/790,457 claims the benefit of U.S. Provisional Pat. App. No. 62/568,298, filed Oct. 4, 2017; said application Ser. No. 15/849,901 is a continuation-in-part of U.S. patent application Ser. No. 15/835,312, filed Dec. 7, 2017, now issued as U.S. Pat. No. 11,055,451 on Jul. 6, 2021; which is a continuation-in-part of U.S. patent application Ser. No. 15/186,453, filed Jun. 18, 2016; said application Ser. No. 16/248,133 is a continuation-in-part of U.S. patent application Ser. No. 15/813,097, filed Nov. 14, 2017; which is a continuation-in-part of Ser. No. 15/616,427, filed Jun. 7, 2017; said application Ser. No. 16/248,133 is a continuation-in-part of U.S. patent application Ser. No. 15/806,697, filed Nov. 8, 2017; which is a continuation-in-part of U.S. patent application Ser. No. 15/376,657, filed Dec. 13, 2016, now issued as U.S. Pat. No. 10,402,906 on Sep. 3, 2019; which is a continuation-in-part of U.S. patent application Ser. No. 15/237,625, filed Aug. 15, 2016, now issued as U.S. Pat. No. 10,248,910 on Apr. 2, 2019; said application Ser. No. 15/806,697 is a continuation-in-part of U.S. patent application Ser. No. 15/343,209, filed Nov. 4, 2016, now issued as U.S. Pat. No. 11,087,403 on Aug. 10, 2021; which is a continuation-in-part of U.S. patent application Ser. No. 15/237,625, filed Aug. 15, 2016, now issued as U.S. Pat. No. 10,248,910 on Apr. 2, 2019; said application Ser. No. 15/343,209 is a continuation-in-part of U.S. patent application Ser. No. 15/229,476, filed Aug. 5, 2016, now issued as U.S. Pat. No. 10,454,791 on Oct. 22, 2019; which is a continuation-in-part of U.S. patent application Ser. No. 15/206,195, filed Jul. 8, 2016; said application Ser. No. 16/248,133 is a continuation-in-part of U.S. patent application Ser. No. 15/673,368, filed Aug. 9, 2017; which is a continuation-in-part of U.S. patent application Ser. No. 15/376,657, filed Dec. 13, 2016, now issued as U.S. Pat. No. 10,402,906 on Sep. 3, 2019; said application Ser. No. 17/061,195 is a continuation-in-part of U.S. patent application Ser. No. 15/879,801, filed Jan. 25, 2018; which is a continuation-in-part of U.S. patent application Ser. No. 15/379,899, filed Dec. 15, 2016; which is a continuation-in-part of U.S. patent application Ser. No. 15/376,657, filed Dec. 13, 2016, now issued as U.S. Pat. No. 10,402,906 on Sep. 3, 2019; said application Ser. No. 17/189,161 is a continuation-in-part of U.S. patent application Ser. No. 16/709,598, filed Dec. 10, 2019, now issued as U.S. Pat. No. 11,507,858 on Nov. 22, 2022; which is a continuation-in-part of U.S. patent application Ser. No. 14/925,974, filed Oct. 28, 2015.

BACKGROUND OF THE INVENTION

Field of the Invention

The present invention is in the field of analysis of very large data sets using distributed computational graph tools which allow for transformation of data through both linear and non-linear transformation pipelines.

Discussion of the State of the Art

The ability to transfer information between individuals, even over large distances, is credited with allowing mankind to rise from a species of primate gatherer-scavengers to forming simple communities. The ability to stably record information so that it could be analyzed for repetitive events, trends, and serve as a base to be expanded and built upon. It is safe to say that the availability of information in formats that allow it to be analyzed and added to by both individuals contemporary to its accrual and those who come after is the most powerful tool available to mankind and likely is what has propelled us to the level of social and technological achievement we have attained.

Nothing has augmented our ability to gather and store information analogous to the rise of electronic and computer technology. There are sensors of all types to measure just about any condition one can imagine. Computers have allowed the health information for a large portion of the human population is stored and accessible. Similarly, detailed data on vehicular accidents, both environmental and vehicle component factors Airline mishaps and crashes can be recreated and studied in great detail. Item information is recorded for the majority of consumer purchases. Further examples abound, but the point has been made. Computer database technology has allowed all of this information to be reliably stored for future retrieval and analysis. The benefits of database technology are so strong that there are very few businesses large or small that do not make some use of a data and knowledge storage solution, either directly for such tasks as inventory control and forecasting or customer relations, or indirectly for ordering. The meteoric rise of computer networking the internet has only served to turn the accrual of information into a torrent as now huge populations can exchange observations, data and ideas, even invited to do so; vast arrays of sensors can be tied together in meaningful ways all of which can be stored for future analysis and use. The receipt and storage of data has gotten to the point where an expert has been quoted as estimating that as much data is currently accrued in two days as was accrued in all history prior to 2003 (Eric Schmidt, Google). Entirely new distributed data storage and retrieval technologies such as Hadoop, and map/reduce; and graph and column based data store organization have been developed to accommodate the influx of information and provide some ability to retrieve information in a guided fashion, but such retrieval has proven to be too labor intensive and rigid to be of use in all but the more superficial and simple of campaigns. Presently, we are accruing vast amounts of information daily but do not have the tools to analyze all but a trickle into knowledge or informed action. What is needed is a system to allow the analysis of current, possibly complex and changing streaming data of interest in the context of the vast stored data that has accumulated relating to it such that meaningful conclusions made and effective action can be taken. To be of use, such a system would also need to possess the ability to self-assess its own operations and key intermediate factors in both the data stream and stored information and make changes to its own function to optimize function and maximize the probability of reliable conclusions.

Data pipelines, which are a progression of functions which each perform some action or transformation on a data stream, offer a mechanism to process quantities of data in the volume discussed directly above. To date however, data pipelines have either been extremely limited in what they do, for example "move data from a web based merchant site to a distributed data store; extract all purchases and classify by product type and region; store the result logs" or have been rigidly programmed and possibly required the uses of highly specific remote protocol calls to perform needed tasks. Even with these additions their capabilities have been very limited and, they have all been linear in configuration which precludes their use for analysis and conclusion or action discovery in a majority of complex situations where branching or even recurrent modification is needed.

What is needed is a system that intelligently combines processing of a current data stream with the ability to retrieve relevant stored data in such a way that conclusions or actions could be drawn in a predictive manner. To work in a timely and efficient manner, the system needs the ability to monitor for both operational issues within its components and should be able to learn and react to intermediate determinations of the analyses it runs and also should be able to self-modify to maintain optimal operation.

SUMMARY OF THE INVENTION

The inventor has developed a system for rapid predictive analysis of very large data sets using a distributed computational graph, that intelligently combines processing of a current data stream with the ability to retrieve relevant stored data in such a way that conclusions or actions could be drawn in a predictive manner.

According to a preferred embodiment of the invention, a system for rapid predictive analysis of very large data sets using the distributed computational graph, comprising a data receipt software module, a data filter software module, a data formalization software module, an input event data store module, a batch event analysis server, a system sanity and retrain software module, a messaging software module, a transformation pipeline software module, and an output software module, is disclosed. The data receipt software module: receives streams of input from one or more of a plurality of data sources, and sends the data stream to the data filter module. The filter software module: receives streams of data from the data receipt software module; removes data records from the stream for a plurality of reasons drawn from, but not limited to, a set comprising absence of all information, damage to data in the record, and presence of in-congruent information or missing information which invalidates the data record; splits filtered data stream into two or more identical parts; sends one identical data stream to the data formalization software module; and sends another identical data stream to the transformation pipeline module of the distributed graph computational module. The data formalization module: receives data stream from the data filter software module; formats the data within data stream based upon a set of predetermined parameters so as to prepare for meaningful storage in a data store; and places the formatted data stream into the input event data store. The input event data store: receives properly formatted data from the data formalization module; and stores the data by method suited to the long term availability, timely retrieval, and analysis of the accumulated data; The batch event analysis server: accesses the data store for information of interest based upon a set of predetermined parameters; aggregates data retrieved from the data store as predetermined that represent such interests as trends of importance, past instances of an event or set of events within a system under analysis or possible cause and effect relationships between two or more variables over many iterations; and provides summary information based upon the breadth of the data analyzed to the messaging software module; and receives communication from the messaging software module which may be in the form of requests for particular information or directives concerning the information being supplied at that time. The transformation pipeline software module: receives streaming data from the data filter software module; performs one or more functions on data within data stream; provides data resultant from the set of function pipeline back to the system; and receives directives from the system sanity and retrain module to modify the function of the pipeline. The messaging software module: receives administrative directives from those conducting the analysis; receives data store analysis summaries from batch event analysis server; receives results of pipeline data functions from transformation pipeline software module; and sends data analysis status and progress related messages as well as administrative execution directives to the system sanity and retrain software module. The system sanity and retrain software module: receives data analysis status and progress information from the messaging software module; compares all incoming information against preassigned parameters to ensure system stability; changes operational behavior within other software modules of system using preexisting guidelines to return required system function; sends alert signal through the output module concerning degraded system status as necessary; and receives and applies any administrative requests for changes in system function. Finally, the output module: receives information destined for outside of the system; formats that information based upon designated end target; and routes that information to the proper port for intended further action.

According to another preferred embodiment of the invention, a method for a system for the predictive analysis of very large data sets using the distributed computational graph, the method comprising the following steps: To receive streaming input from one or more of a plurality of data sources. To filter data of incomplete, misconfigured or damaged input. To formalize input data for use in batch and streaming portions of method using pre-designed standard. To perform a set of one or more data transformations on formalized input. To perform sanity checks of results of transformation pipeline analysis of streaming data as well as analysis process retraining based upon batch analysis of input data. Finally, to output the results of the analysis process in format predecided upon by the authors of the analysis.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

Figure 4:
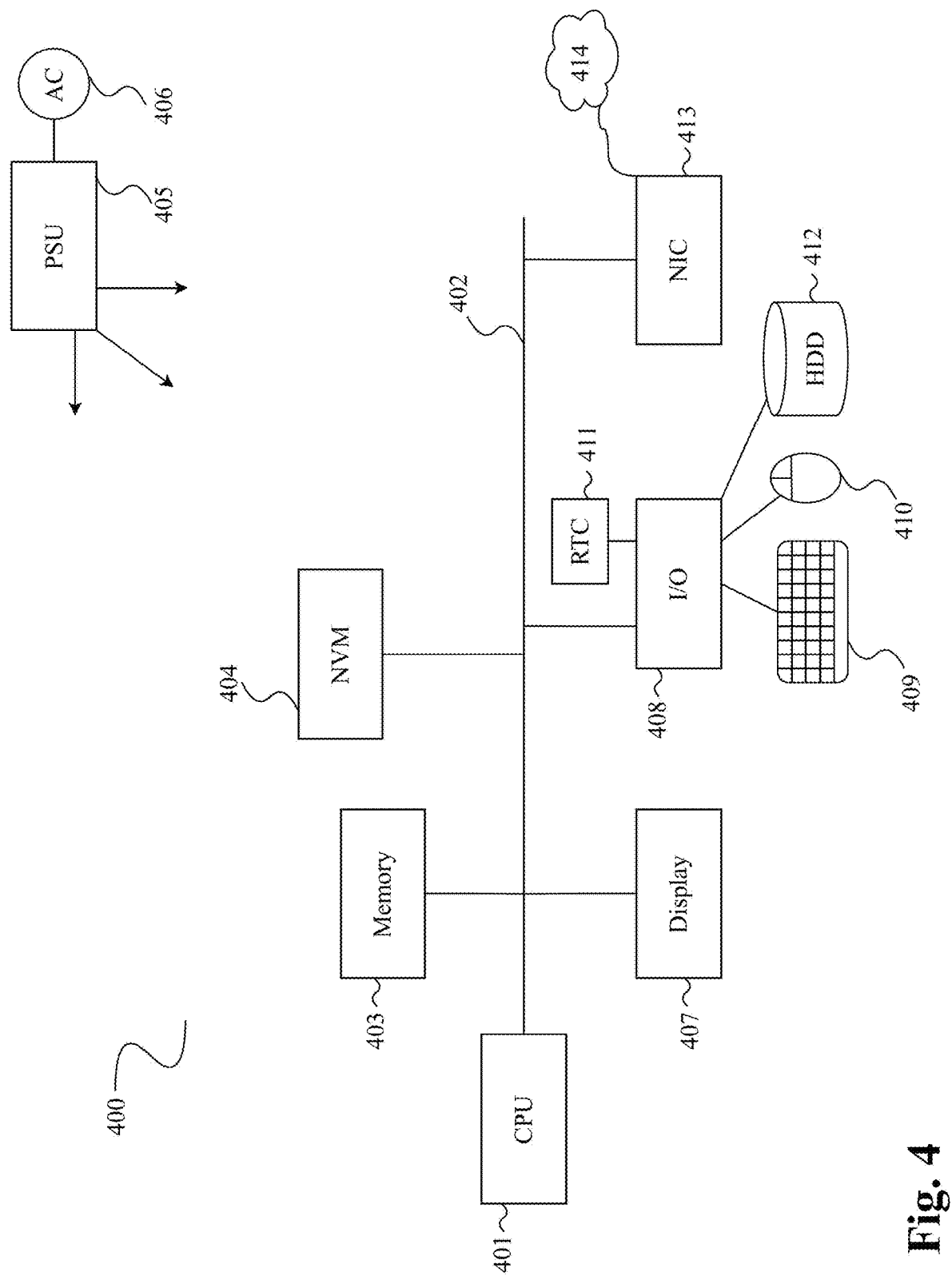
Figure 5:
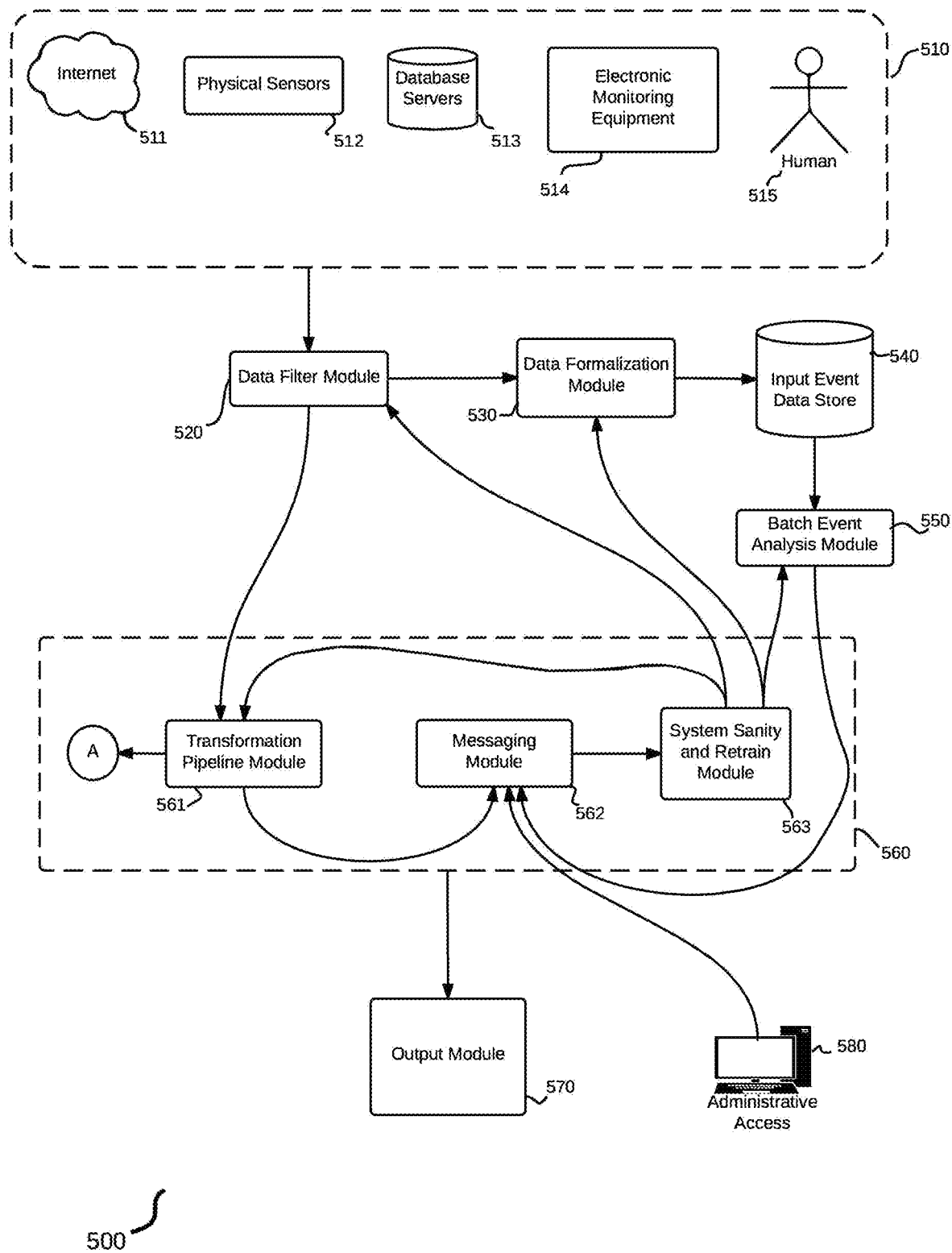

FIG. 4 is a block diagram illustrating an exemplary overview of a computer system as may be used in any of the various locations throughout the system FIG. 5 is a diagram of an exemplary architecture for a system where streams of input data from one or more of a plurality of sources are analyzed to predict outcome using both batch analysis of acquired data and transformation pipeline manipulation of current streaming data according to an embodiment of the invention.

Figure 6:
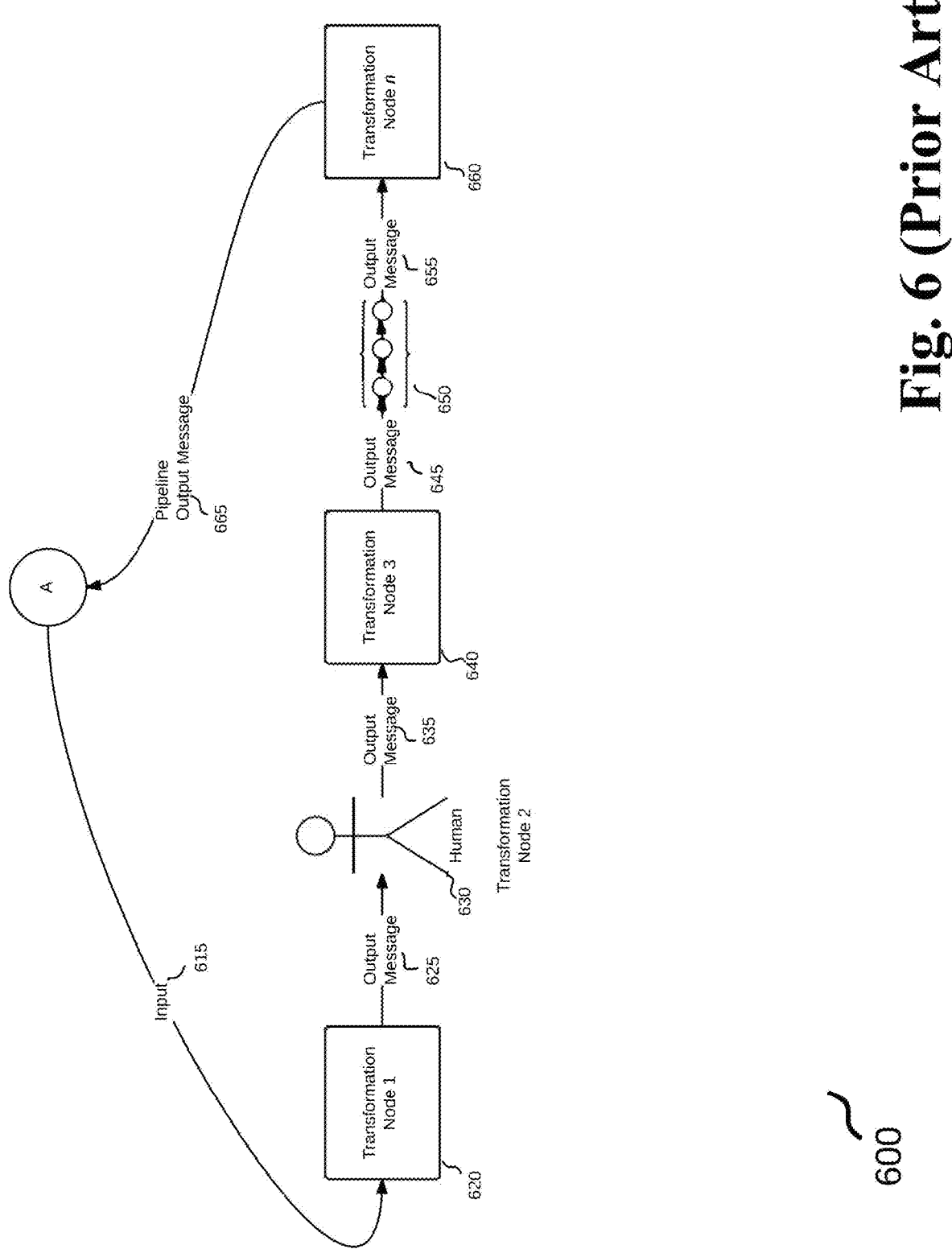

FIG. 6 (Prior Art) is a diagram of an exemplary architecture for a linear transformation pipeline system which introduces the concept of the transformation pipeline as a directed graph of transformation nodes and messages according to an embodiment of the invention.

Figure 7:
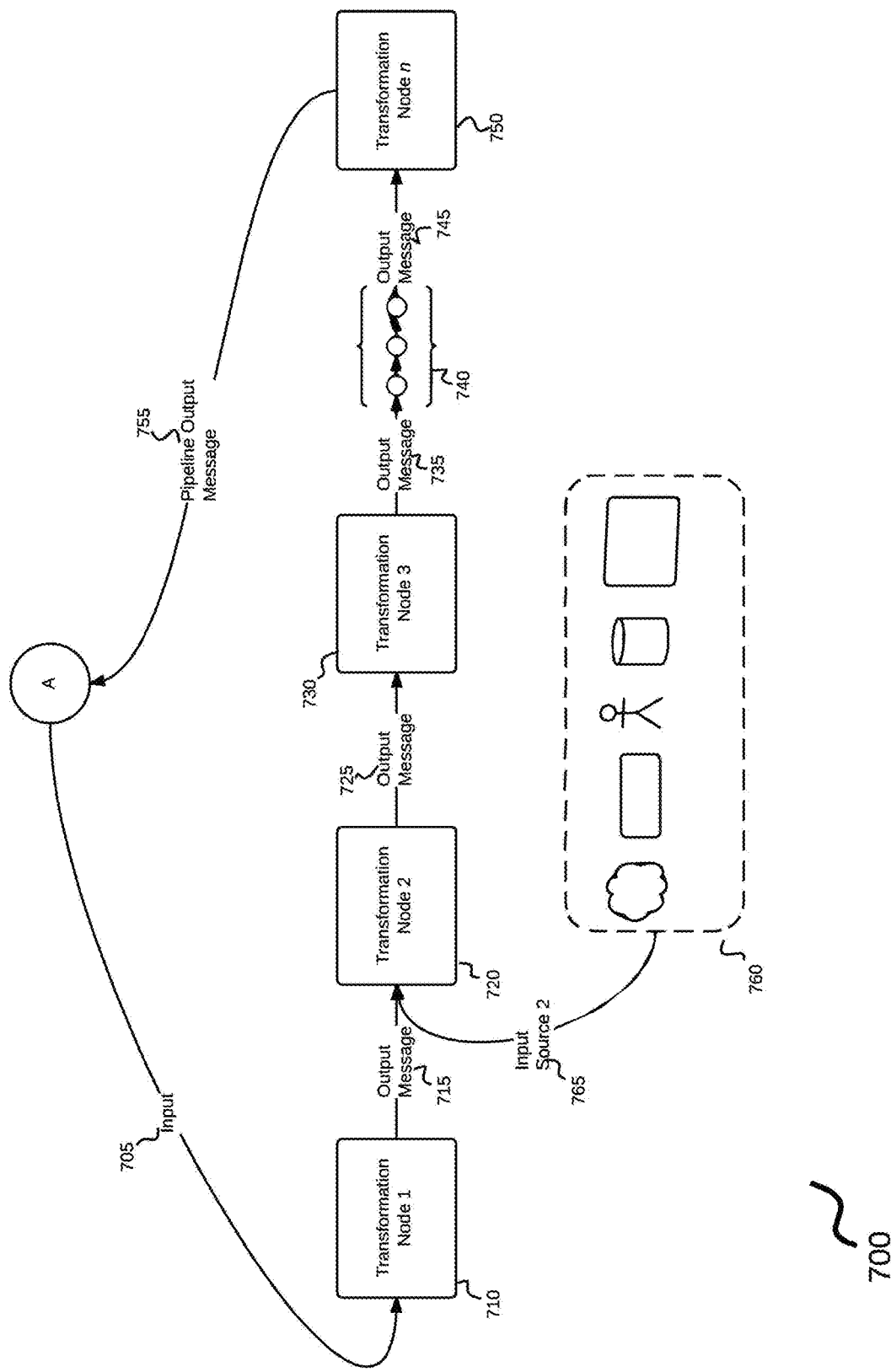

FIG. 7 is a diagram of an exemplary architecture for a transformation pipeline system where one of the transformations receives input from more than one source which introduces the concept of the transformation pipeline as a directed graph of transformation nodes and messages according to an embodiment of the invention.

Figure 8:
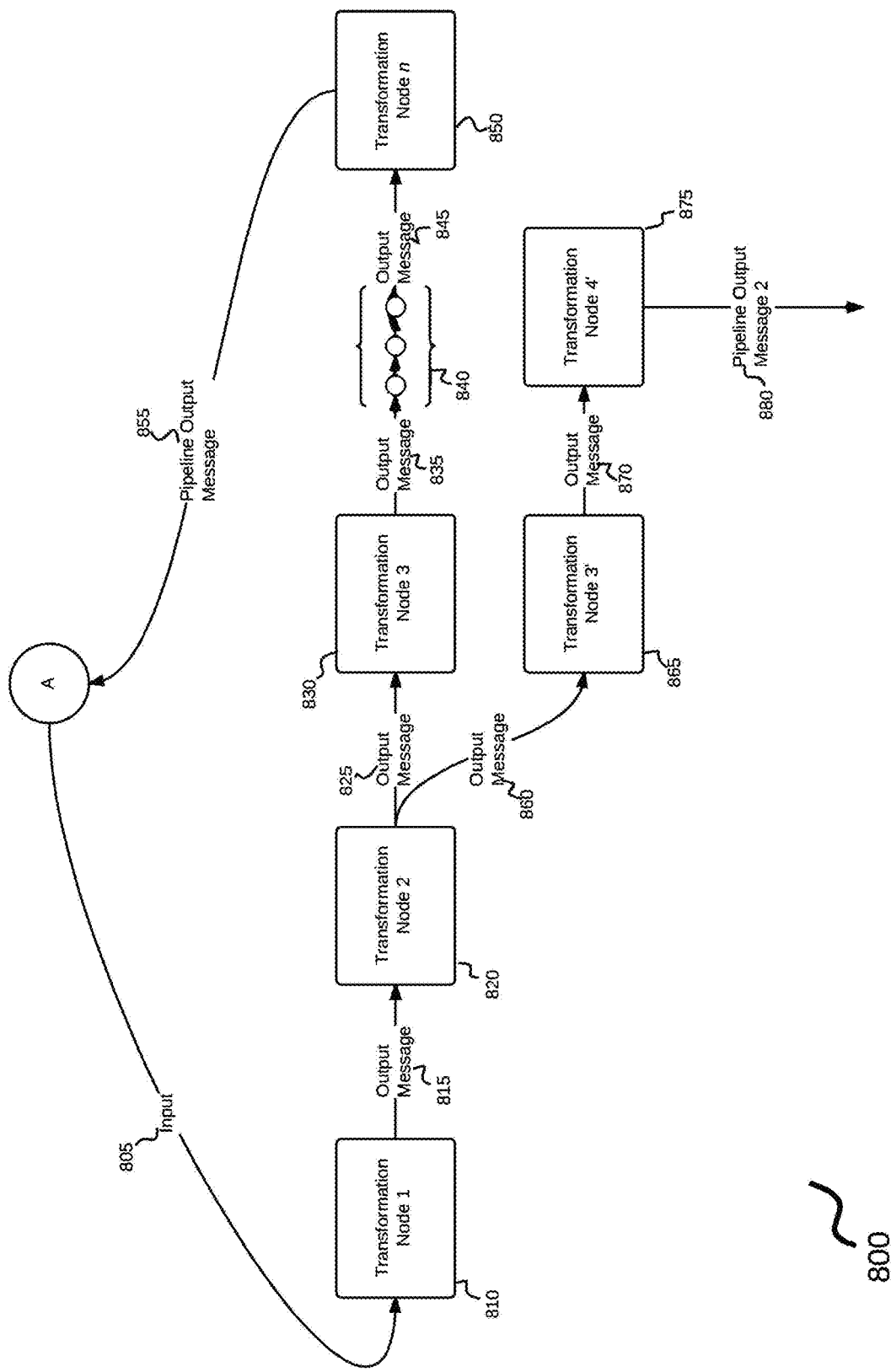

FIG. 8 is a diagram of an exemplary architecture for a transformation pipeline system where the output of one data transformation servers as the input of more than one downstream transformations which introduces the concept of the transformation pipeline as a directed graph of transformation nodes and messages according to an embodiment of the invention.

Figure 9:
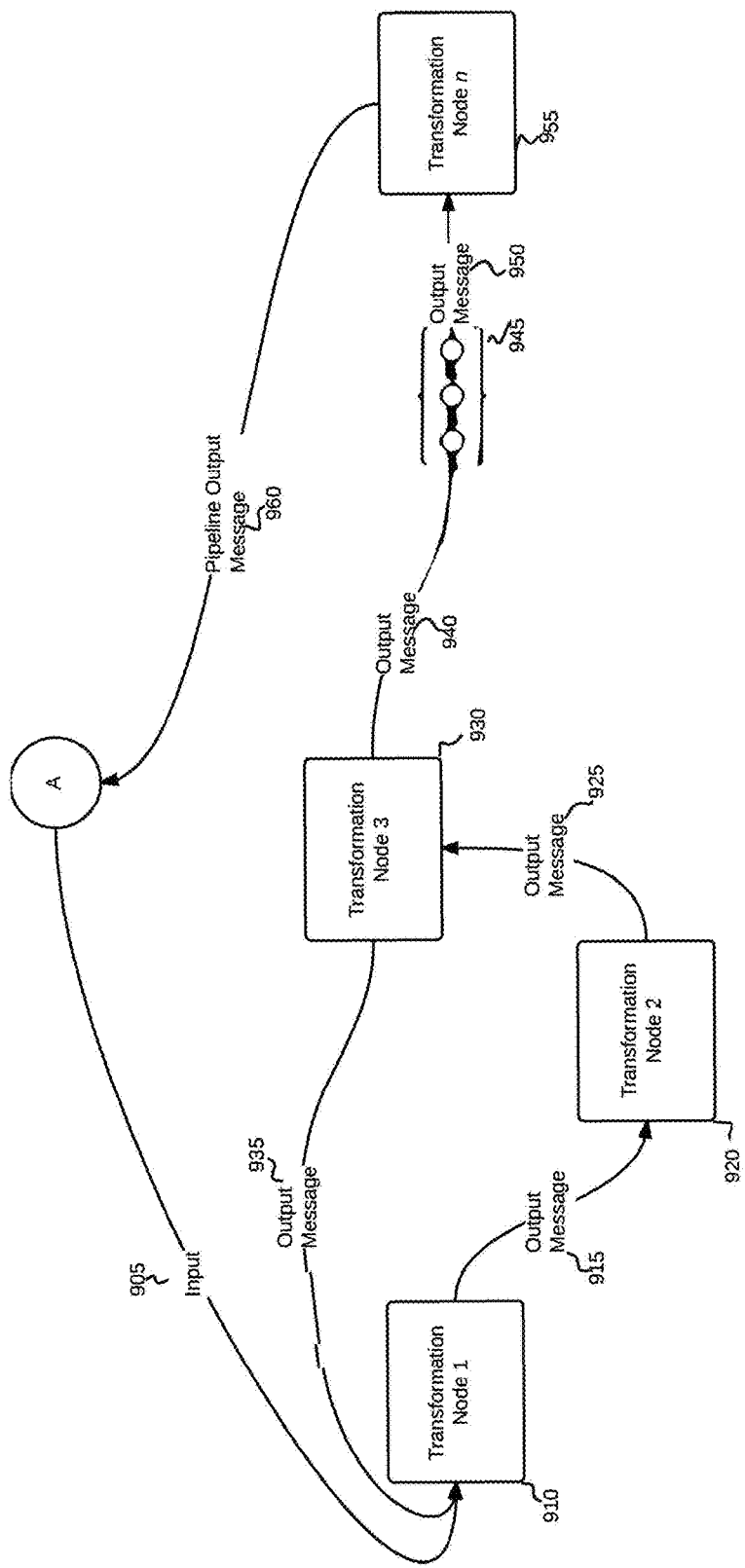

FIG. 9 is a diagram of an exemplary architecture for a transformation pipeline system where a set of three data transformations act to form a cyclical pipeline which also introduces the concept of the transformation pipeline as a directed graph of transformation nodes and messages according to an embodiment of the invention.

Figure 10:
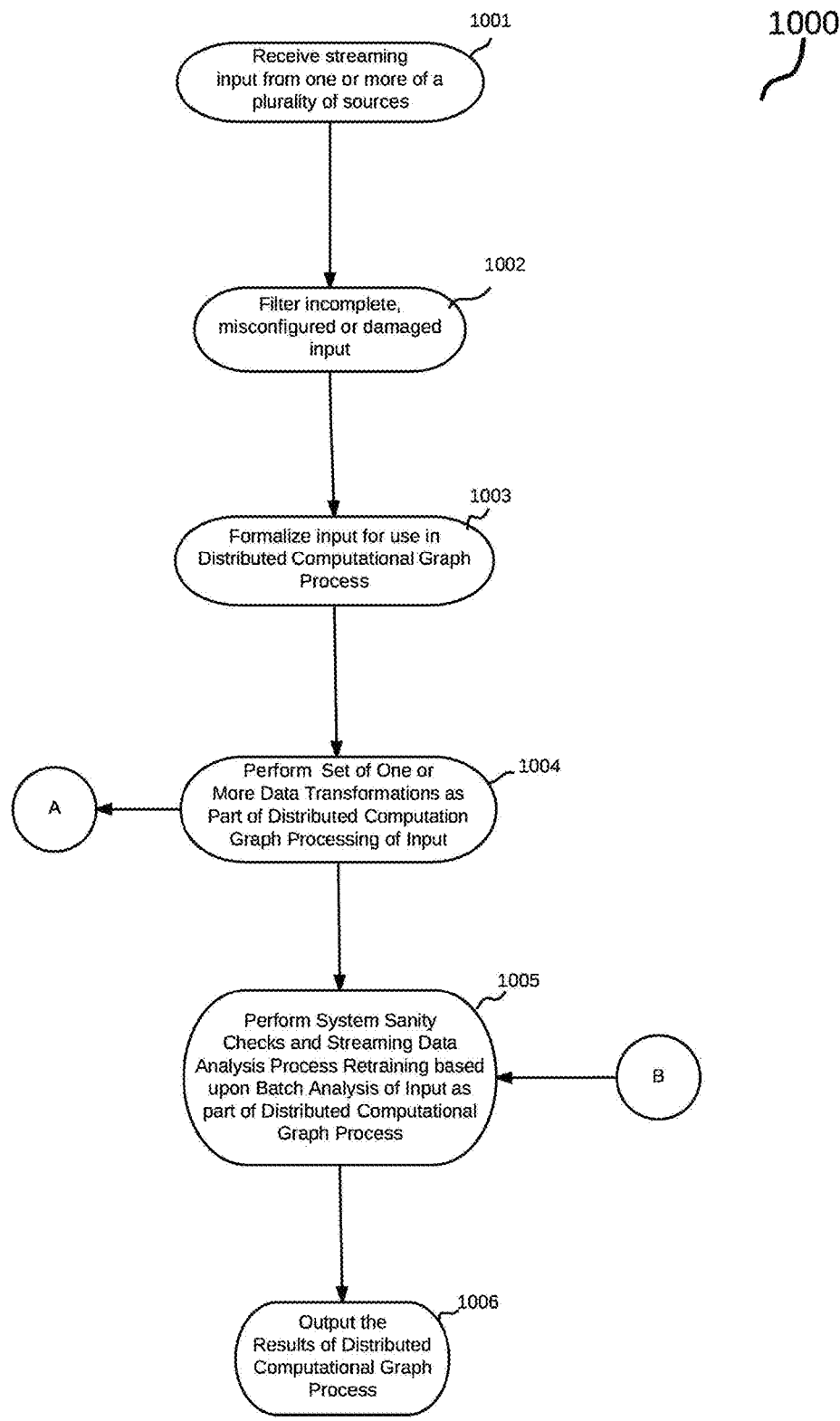

FIG. 10 is a process flow diagram of a method for the receipt, processing and predictive analysis of streaming data using a system of the invention.

Figure 11:
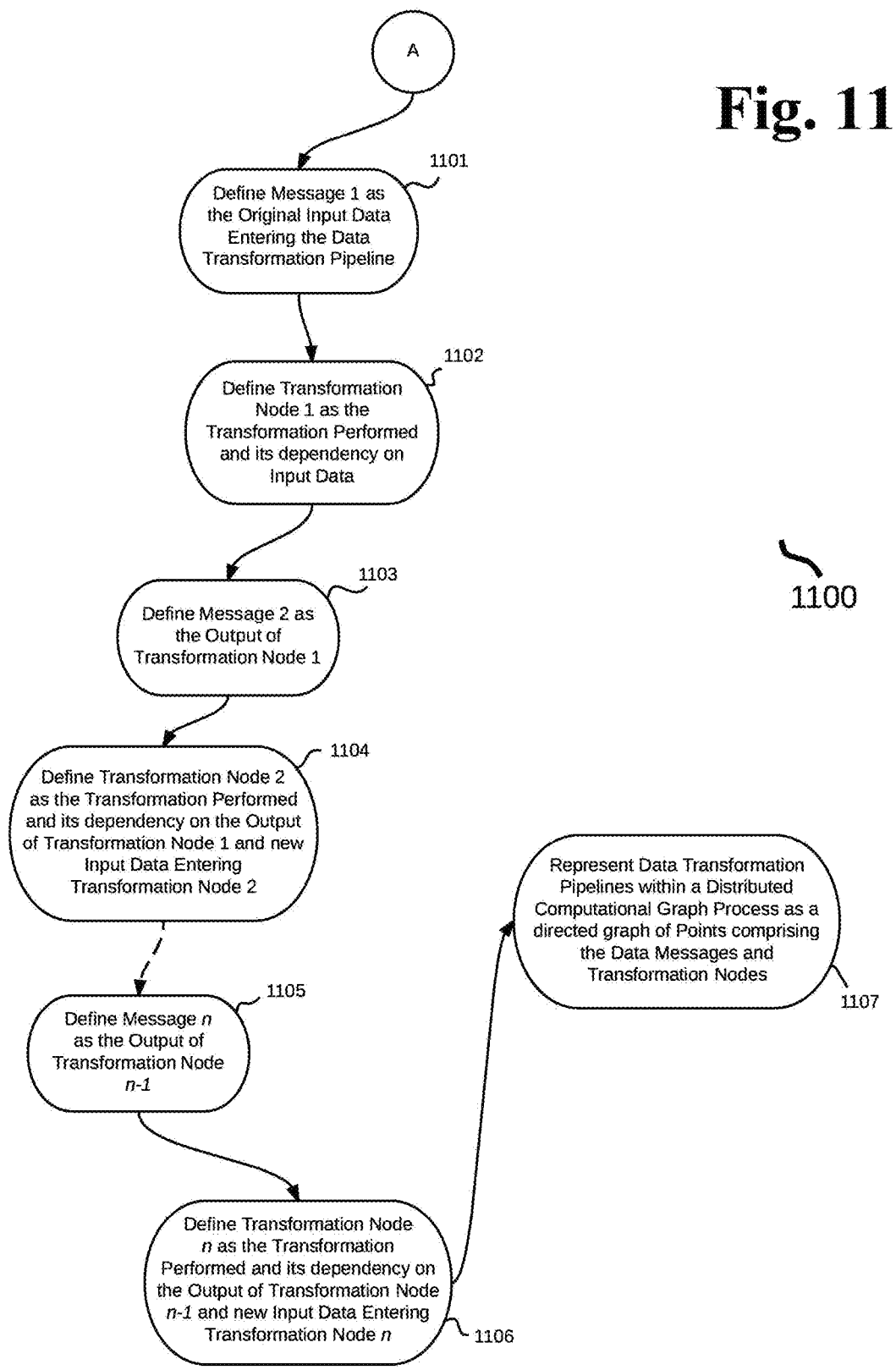

FIG. 11 is a process flow diagram of a method for representing the operation of the transformation pipeline as a directed graph function using a system of the invention.

Figure 12:
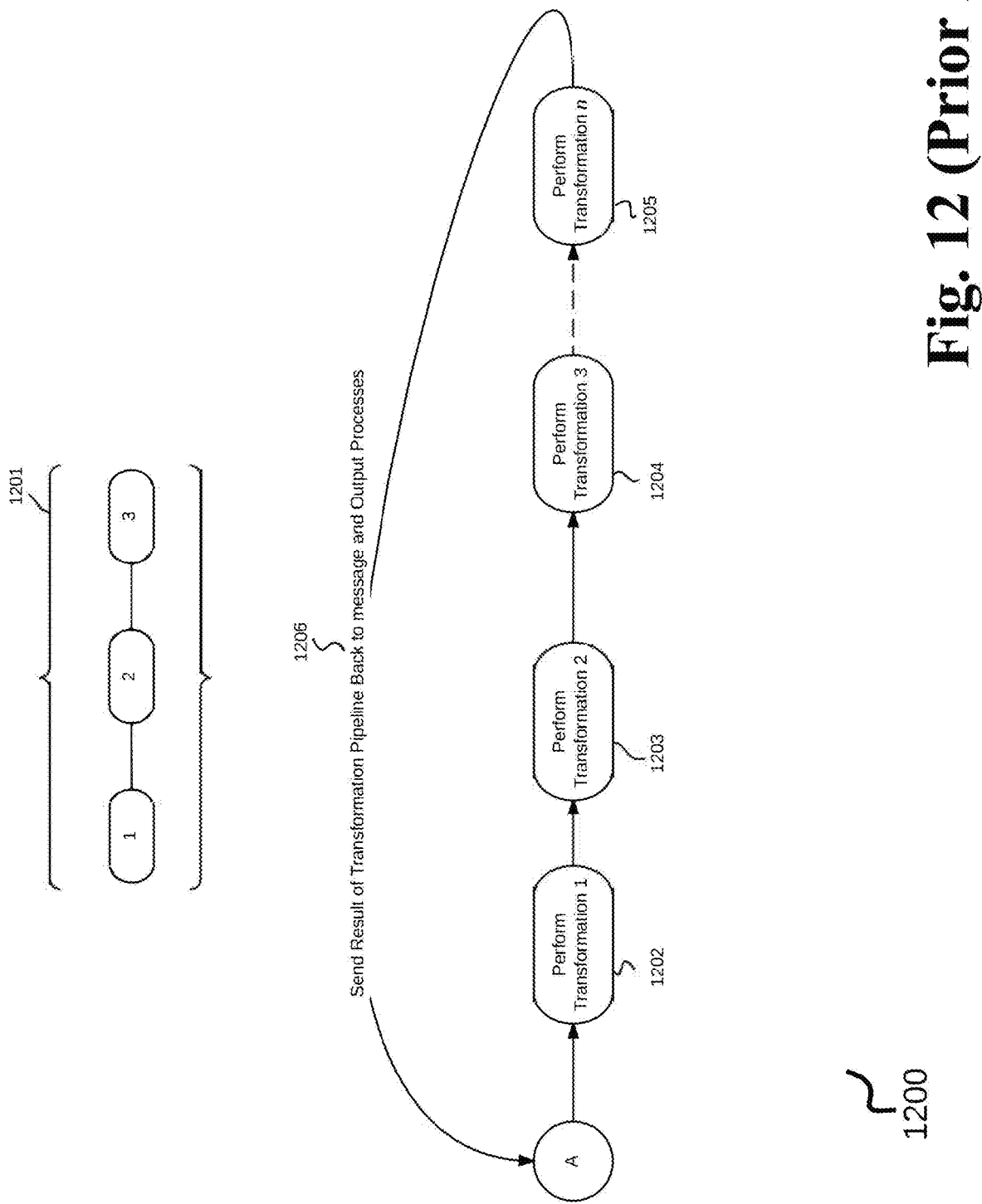

FIG. 12 (Prior Art) is a process flow diagram of a method for a linear data transformation pipeline using a system of the invention.

Figure 13:
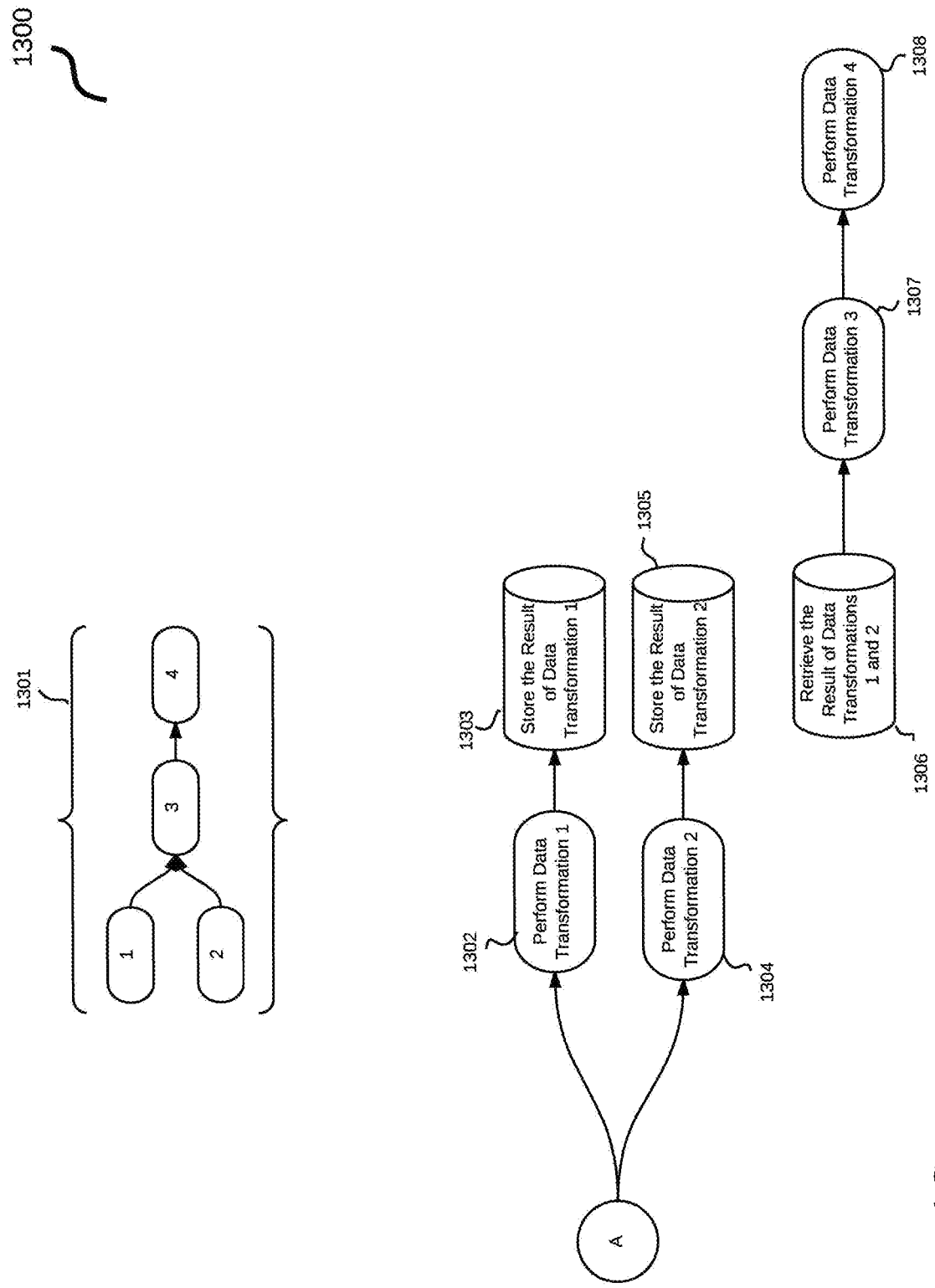

FIG. 13 is a process flow diagram of a method for the disposition of input from two antecedent data transformations into a single data transformation of transformation pipeline using a system of the invention.

Figure 14:
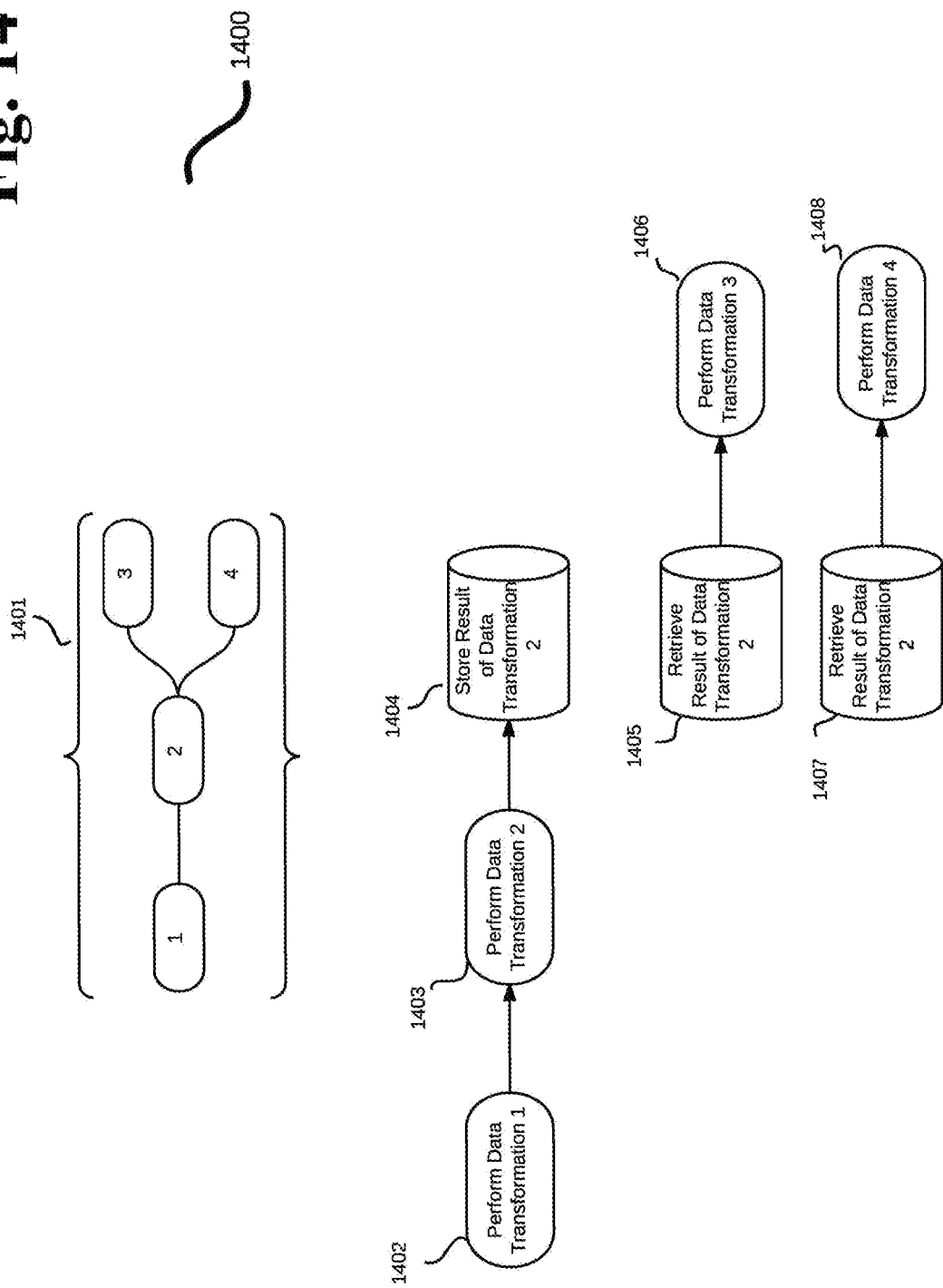

FIG. 14 is a process flow diagram of a method for the disposition of output of one data transformation that then serves as input to two postliminary data transformations using a system of the invention.

Figure 15:
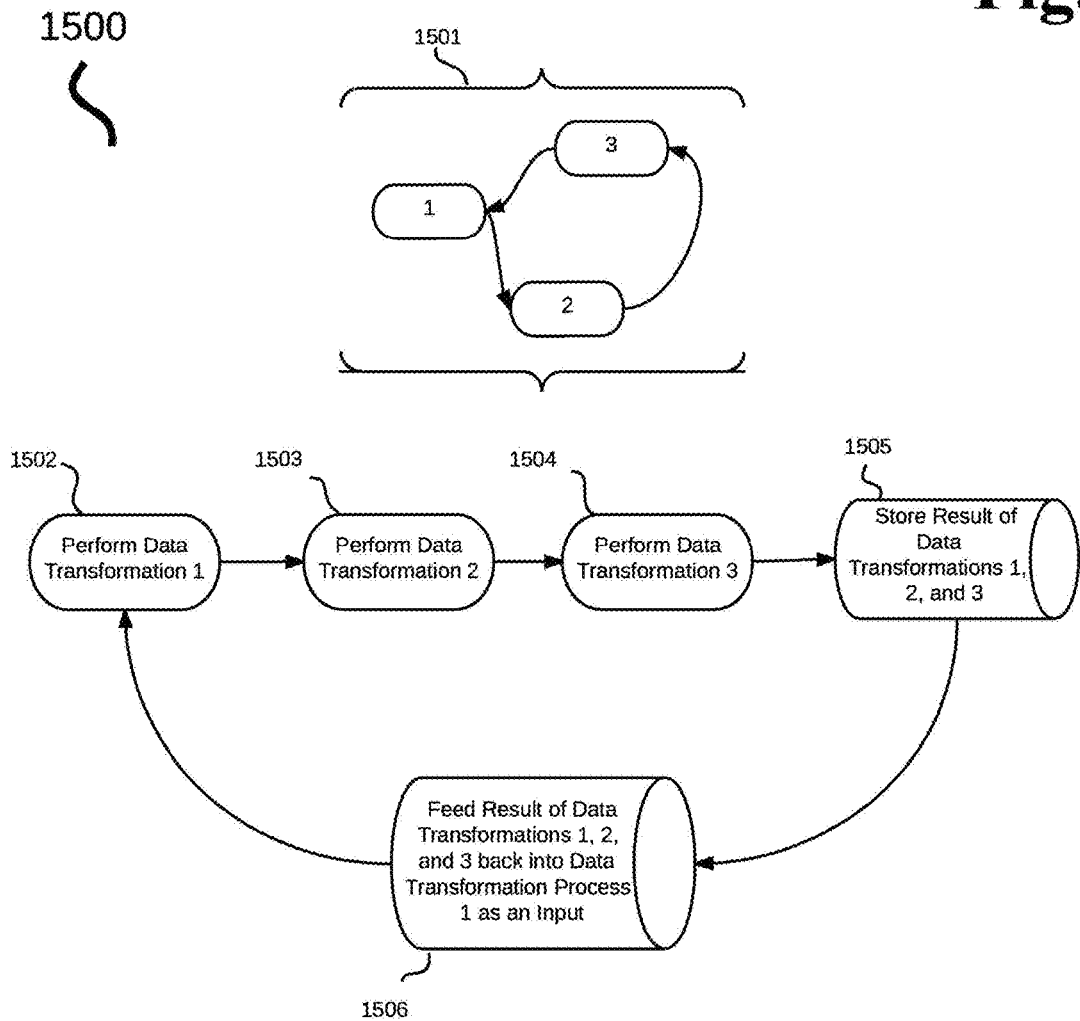

FIG. 15 is a process flow diagram of a method for processing a set of three or more data transformations within a data transformation pipeline where output of the last member transformation of the set serves as input of the first member transformation thereby creating a cyclical relationship using a system of the invention.

Figure 16:
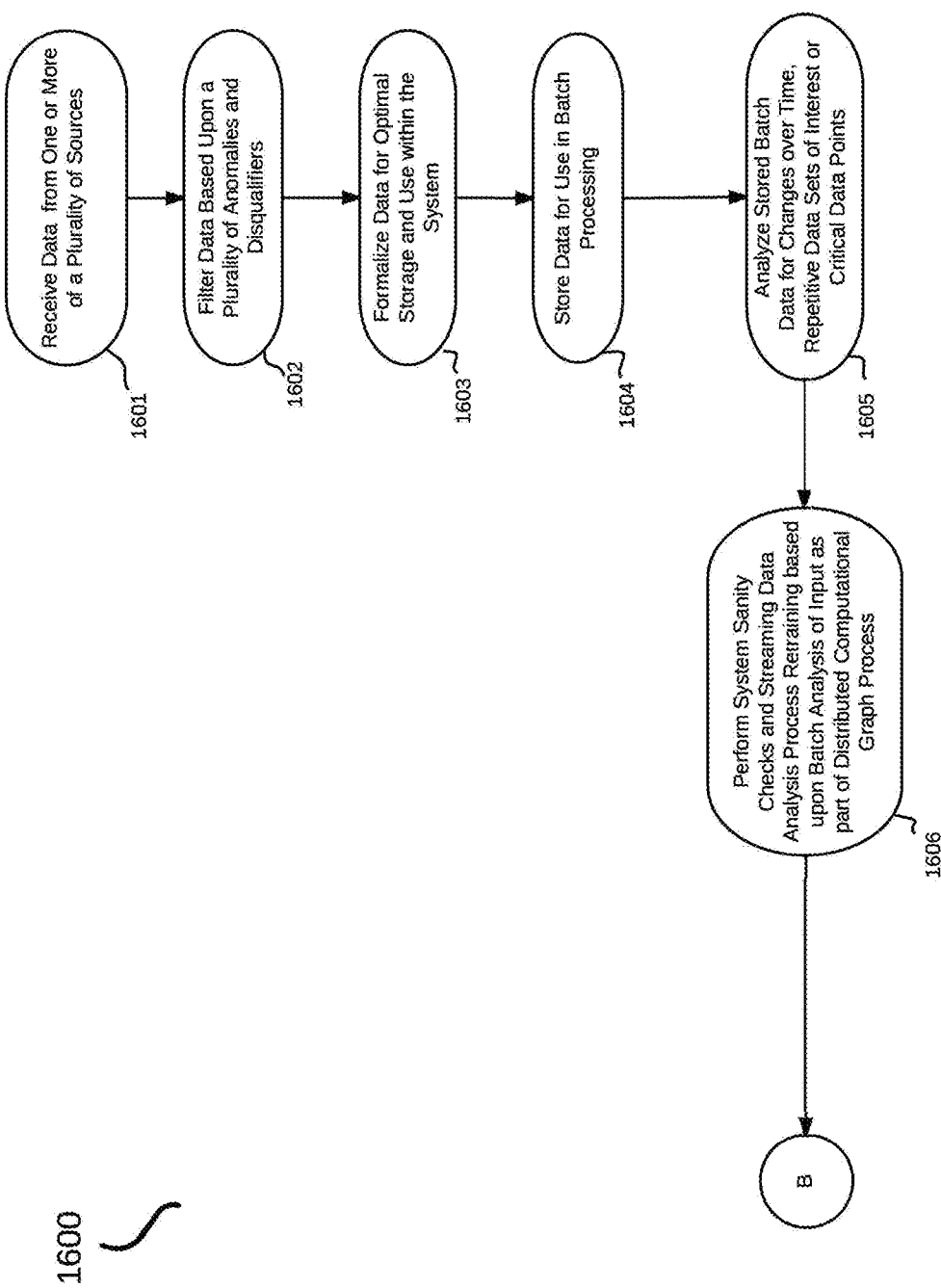

FIG. 16 is a process flow diagram of a method for the receipt and use of streaming data into batch storage and analysis of changes over time, repetition of specific data sequences or the presence of critical data points using a system of the invention.

DETAILED DESCRIPTION OF THE INVENTION

The inventor has conceived, and reduced to practice, various systems and methods for predictive analysis of very large data sets using a distributed computational graph.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as a example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system possibly networked with others in a data processing center, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 1:
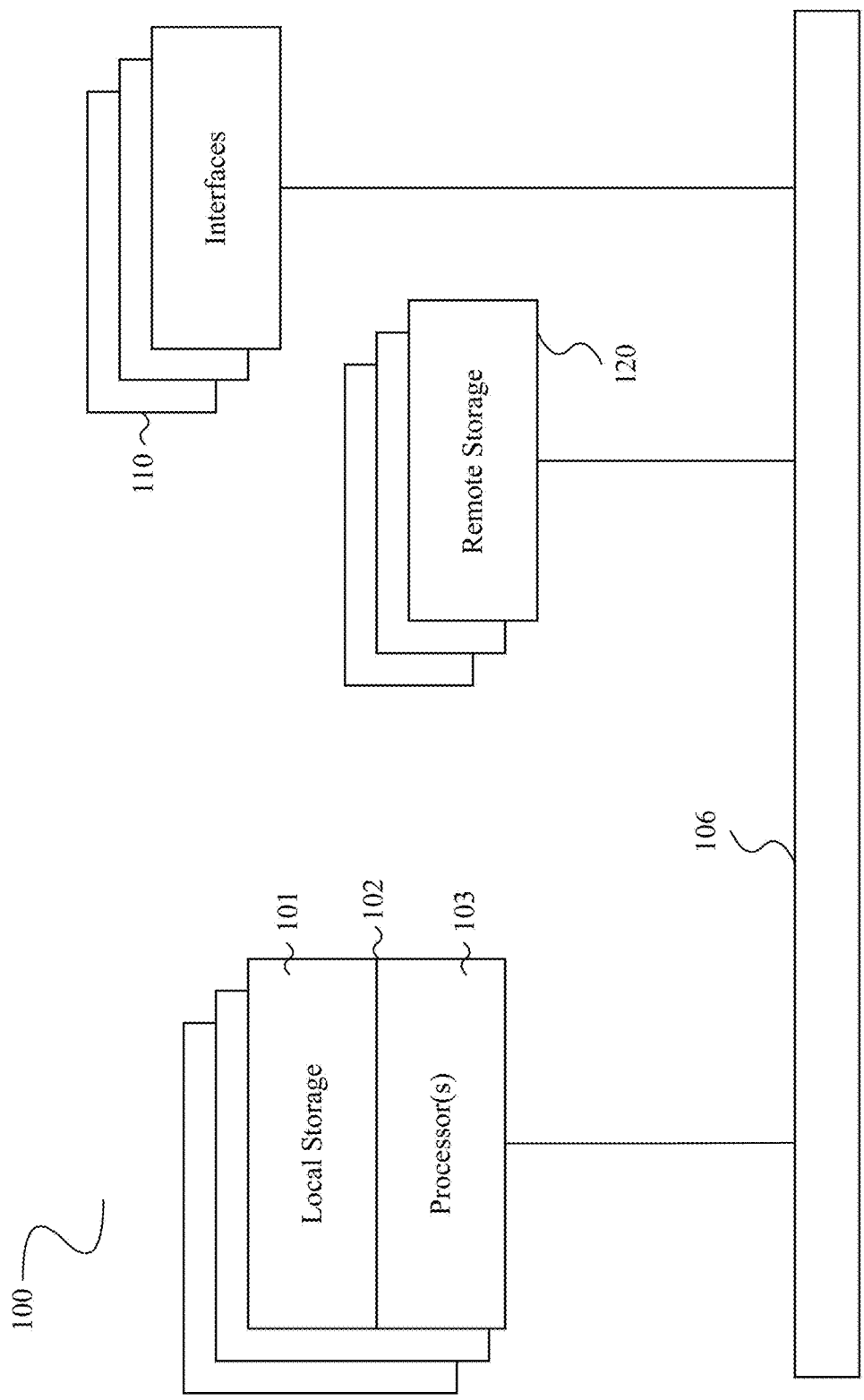
FIG. 1 is a block diagram illustrating an exemplary hardware architecture of a computing device used in various embodiments of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more buses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and Boukhtouta, et al., "Graph-theoretic characterization of cyber-threat infrastructures", Digital Investigation, 2015, vol. 14, p. S3-S15, USA. interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 2:
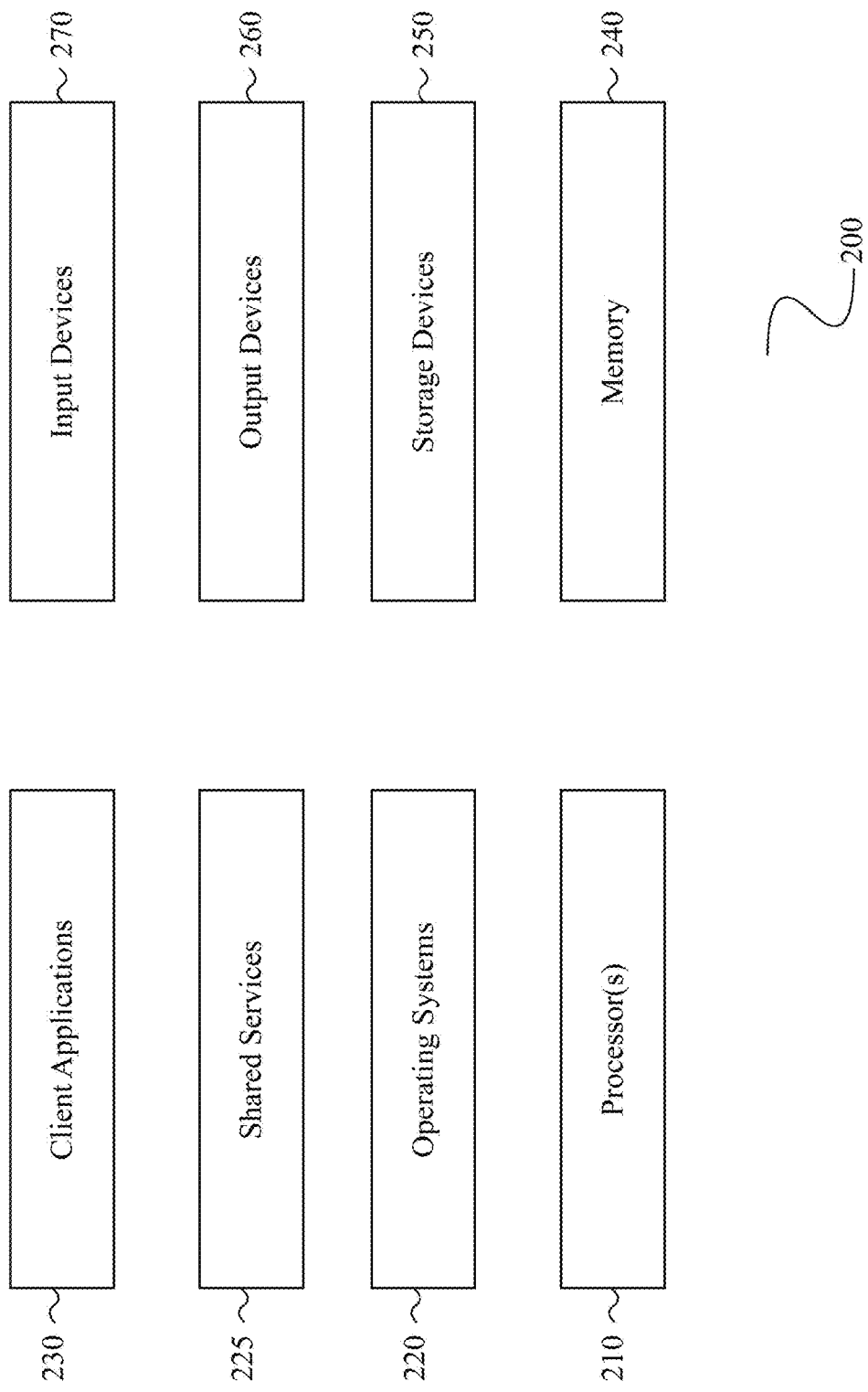
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows operating system, Apple's Mac OS/X or iOS operating systems, some variety of the Linux operating system, Google's Android operating system, or the like. In many cases, one or more shared services 225 may be operable in system 200, and may be useful for providing common services to client applications 230. Services 225 may for example be Windows services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
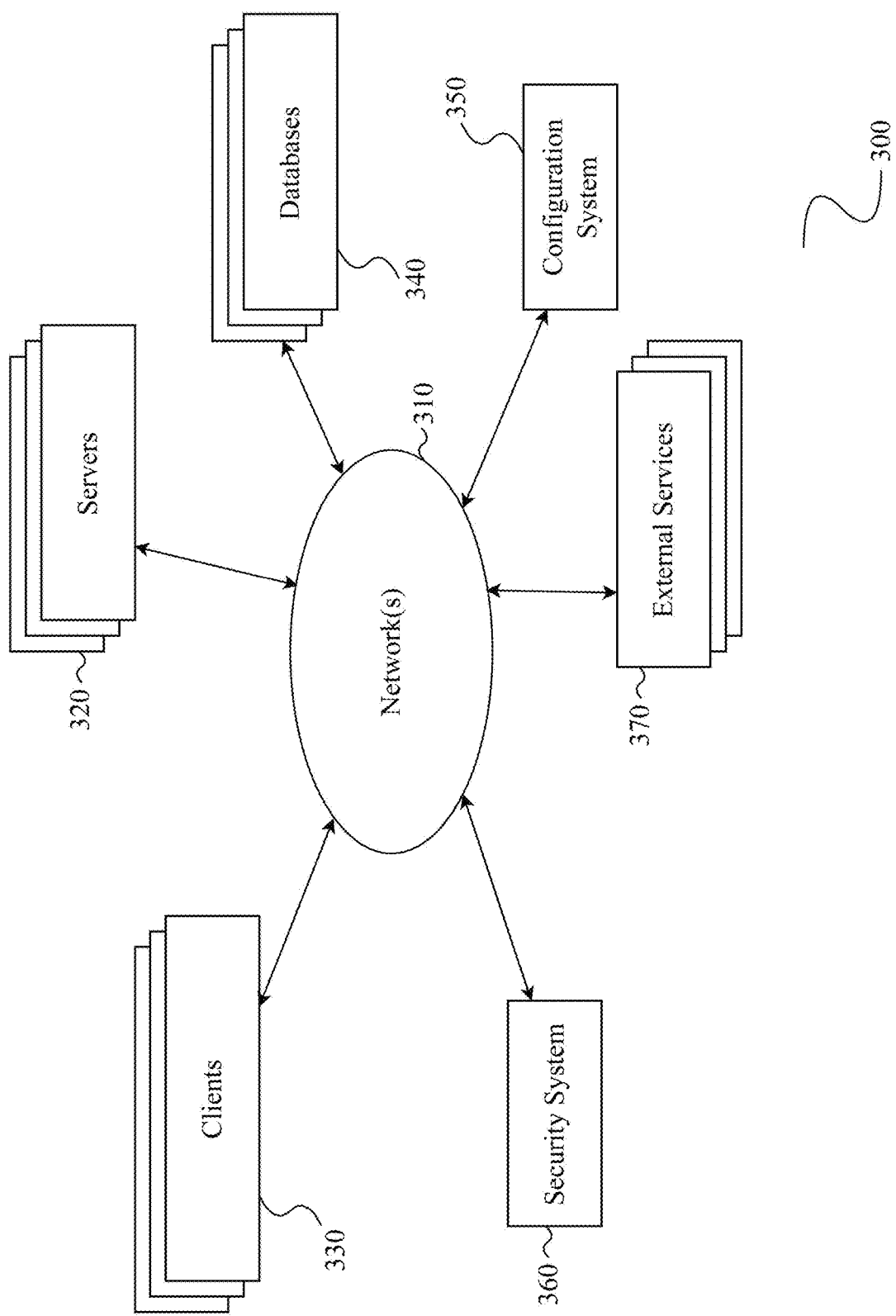
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, key-value stores, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 5 is a block diagram of an exemplary architecture for a system 500 for predictive analysis of very large data sets using a distributed computational graph. According to the embodiment, streaming input feeds 510 may be a variety of data sources which may include but are not limited to the internet 511, arrays of physical sensors 512, database servers 513, electronic monitoring equipment 514 and direct human interaction 515 ranging from a relatively few number of participants to a large crowd sourcing campaign. Streaming data from any combinations of listed sources and those not listed may also be expected to occur as part of the operation of the invention as the number of streaming input sources is not limited by the design. All incoming streaming data may be passed through a data filter software module 520 to remove information that has been damaged in transit, is misconfigured, or is malformed in some way that precludes use. Many of the filter parameters may be expected to be preset prior to operation, however, design of the invention makes provision for the behavior of the filter software module 520 to be changed as progression of analysis requires through the automation of the system sanity and retrain software module 563 which may serve to optimize system operation and analysis function. The data stream may also be split into two identical substreams at the data filter software module 520 with one substream being fed into a streaming analysis pathway that includes the transformation pipeline software module 561 of the distributed computational graph 560. The other substream may be fed to data formalization software module 530 as part of the batch analysis pathway. The data formalization module 530 formats the data stream entering the batch analysis pathway of the invention into data records to be stored by the input event data store 540. The input event data store 540 can be a database of any architectural type known to those knowledgeable in the art, but based upon the quantity of the data the data store module would be expected to store and retrieve, options using highly distributed storage and map reduce query protocols, of which Hadoop is one, but not the only example, may be generally preferable to relational database schema.

Analysis of data from the input event data store may be performed by the batch event analysis software module 550. This module may be used to analyze the data in the input event data store for temporal information such as trends, previous occurrences of the progression of a set of events, with outcome, the occurrence of a single specific event with all events recorded before and after whether deemed relevant at the time or not, and presence of a particular event with all documented possible causative and remedial elements, including best guess probability information. Those knowledgeable in the art will recognize that while examples here focus on having stores of information pertaining to time, the use of the invention is not limited to such contexts as there are other fields where having a store of existing data would be critical to predictive analysis of streaming data 561. The search parameters used by the batch event analysis software module 550 are preset by those conducting the analysis at the beginning of the process, however, as the search matures and results are gleaned from the streaming data during transformation pipeline software module 561 operation, providing the system more timely event progress details, the system sanity and retrain software module 563 may automatically update the batch analysis parameters 550. Alternately, findings outside the system may precipitate the authors of the analysis to tune the batch analysis parameters administratively from outside the system 570, 562, 563. The real-time data analysis core 560 of the invention should be considered made up of a transformation pipeline software module 561, messaging module 562 and system sanity and retrain software module 563. The messaging module 562 has connections from both the batch and the streaming data analysis pathways and serves as a conduit for operational as well as result information between those two parts of the invention. The message module also receives messages from those administering analyses 580. Messages aggregated by the messaging module 562 may then be sent to system sanity and retrain software module 563 as appropriate. Several of the functions of the system sanity and retrain software module have already been disclosed. Briefly, this is software that may be used to monitor the progress of streaming data analysis optimizing coordination between streaming and batch analysis pathways by modifying or "retraining" the operation of the data filter software module 520, data formalization software module 530 and batch event analysis software module 540 and the transformation pipeline module 550 of the streaming pathway when the specifics of the search may change due to results produced during streaming analysis. System sanity and retrain module 563 may also monitor for data searches or transformations that are processing slowly or may have hung and for results that are outside established data stability boundaries so that actions can be implemented to resolve the issue. While the system sanity and retrain software module 563 may be designed to act autonomously and employs computer learning algorithms, according to some arrangements status updates may be made by administrators or potentially direct changes to operational parameters by such, according to the embodiment.

Streaming data entering from the outside data feeds 510 through the data filter software module 520 may be analyzed in real time within the transformation pipeline software module 561. Within a transformation pipeline, a set of functions tailored to the analysis being run are applied to the input data stream. According to the embodiment, functions may be applied in a linear, directed path or in more complex configurations. Functions may be modified over time during an analysis by the system sanity and retrain software module 563 and the results of the transformation pipeline, impacted by the results of batch analysis are then output in the format stipulated by the authors of the analysis which may be human readable printout, an alarm, machine readable information destined for another system or any of a plurality of other forms known to those in the art.

FIG. 6 (Prior Art) is a block diagram of a preferred architecture for a transformation pipeline within a system for predictive analysis of very large data sets using distributed computational graph 600. According to the embodiment, streaming input from the data filter software module 520, 615 serves as input to the first transformation node 620 of the transformation pipeline. Transformation node's function is performed on input data stream and transformed output message 625 is sent to transformation node 2 630. The progression of transformation nodes 620, 630, 640, 650, 660 and associated output messages from each node 625, 635, 645, 655 is linear in configuration this is the simplest arrangement and, as previously noted, represents the current state of the art. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent function of another transformation pipeline. It should be appreciated that the node length of transformation pipelines depicted in no way confines the transformation pipelines employed by the invention to an arbitrary maximum length 640, 650, 660 as, being distributed, the number of transformations would be limited by the resources made available to each implementation of the invention. It should be further appreciated that there need be no limits on transform pipeline length. Output of the last transformation node and by extension, the transform pipeline 660 may be sent back to messaging software module 562 for predetermined action.

FIG. 7 is a block diagram of another preferred architecture for a transformation pipeline within a system for predictive analysis of very large data sets using distributed computational graph 700. According to the embodiment, streaming input from a data filter software module 520, 705 serves as input to the first transformation node 710 of the transformation pipeline. Transformation node's function is performed on input data stream and transformed output message 715 is sent to transformation node 2 720. In this embodiment, transformation node 2 720 has a second input stream 760. The specific source of this input is inconsequential to the operation of the invention and could be another transformation pipeline software module, a data store, human interaction, physical sensors, monitoring equipment for other electronic systems or a stream from the internet as from a crowdsourcing campaign, just to name a few possibilities 760. Functional integration of a second input stream into one transformation node requires the two input stream events be serialized. The invention performs this serialization using a decomposable transformation software module (not shown), the function of which is described below, referring to FIG. 13. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent function of another transformation pipeline. It should be appreciated that the node length of transformation pipelines depicted in no way confines the transformation pipelines employed by the invention to an arbitrary maximum length 710, 720, 730, 740, 750, as, being distributed, the number of transformations would be limited by the resources made available to each implementation of the invention. It should be further appreciated that there need be no limits on transform pipeline length. Output of the last transformation node and by extension, the transform pipeline, 750 may be sent back to messaging software module 562 for pre-decided action.

FIG. 8 is a block diagram of another preferred architecture for a transformation pipeline within a system for predictive analysis of very large data sets using distributed computational graph 700. According to the embodiment, streaming input from a data filter software module 520, 805 serves as input to the first transformation node 810 of the transformation pipeline. Transformation node's function is performed on input data stream and transformed output message 815 is sent to transformation node 2 820. In this embodiment, transformation node 2 820 sends its output stream to two transformation pipelines 830, 840, 850; 865, 875. This allows the same data stream to undergo two disparate, possibly completely unrelated, analyses without having to duplicate the infrastructure of the initial transform manipulations, greatly increasing the expressivity of the invention over current transform pipelines. Functional integration of a second output stream from one transformation node 820 requires that the two output stream events be serialized. The invention performs this serialization using a decomposable transformation software module (not shown), the function of which is described below, referring to FIG. 14. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in pipelines, which may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent function of another transformation pipeline. It should be appreciated that the node number of transformation pipelines depicted in no way confines the transformation pipelines employed by the invention to an arbitrary maximum length 810, 820, 830, 840, 850; 865, 875 as, being distributed, the number of transformations would be limited by the resources made available to each implementation of the invention. Further according to the embodiment, there need be no limits on transform pipeline length. Output of the last transformation node and by extension, the transform pipeline 850 may be sent back to messaging software module 562 for contemporary enabled action.

FIG. 9 is a block diagram of another preferred architecture for a transformation pipeline within a system for predictive analysis of very large data sets using distributed computational graph 700. According to the embodiment, streaming input from a data filter software module 520, 905 serves as input to the first transformation node 910 of the transformation pipeline. Transformation node's function may be performed on an input data stream and transformed output message 915 may then be sent to transformation node 2 920. Likewise, once the data stream is acted upon by transformation node 2 920, its output is sent to transformation node 3 930 using its output message 925 In this embodiment, transformation node 3 930 sends its output stream back to transform node 1 910 forming a cyclical relationship between transformation nodes 1 910, transformation node 2 920 and transformation node 3 930. Upon the achievement of some gateway result, the output of cyclical pipeline activity may be sent to downstream transformation nodes within the pipeline 940, 945. The presence of a generalized cyclical pathway construct allows the invention to be used to solve complex iterative problems with large data sets involved, expanding ability to rapidly retrieve conclusions for complicated issues. Functional creation of a cyclical transformation pipeline requires that each cycle be serialized. The invention performs this serialization using a decomposable transformation software module (not shown), the function of which is described below, referring to FIG. 15. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will appreciate that certain transformations in pipelines, may be entirely self-contained; certain transformations may involve direct human interaction 630, such as selection via dial or dials, positioning of switch or switches, or parameters set on control display, all of which may change during analysis; still other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent the cumulative function of another transformation pipeline. It should be appreciated that the node number of transformation pipelines depicted in no way confines the transformation pipelines employed by the invention to an arbitrary maximum length 910, 920, 930, 940, 950; 965, 975 as, being distributed, the number of transformations would be limited by the resources made available to each implementation of the invention. It should be further appreciated that there need be no limits on transform pipeline length. Output of the last transformation node and by extension, the transform pipeline 955 may be sent back to messaging software module 562 for concomitant enabled action.

Description of Method Embodiments

FIG. 10 is a process flow diagram of a method 1000 for predictive analysis of very large data sets using the distributed computational graph. One or more streams of data from a plurality of sources, which includes, but is in no way not limited to, a number of physical sensors, web based questionnaires and surveys, monitoring of electronic infrastructure, crowd sourcing campaigns, and direct human interaction, may be received by system 1001. The received stream is filtered 1002 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing 1600 while another substream may be formalized 1003 for transformation pipeline analysis 1004, 561, 600, 700, 800, 900. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the embodiment, individual transformations can receive input of expected form from more than one source 1300 or receive no input at all as would a transformation acting as a timestamp. According to the embodiment, individual transformations, may not modify the data as would be encountered with a data store acting as a queue for downstream transformations 1303, 1305, 1405, 1407, 1505. According to the embodiment, individual transformations may provide output to more than one downstream transformations 1400. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to the invention, transformations in a transformation pipeline backbone may form a linear, a quasi-linear arrangement or may be cyclical 1500, where the output of one of the internal transformations serves as the input of one of its antecedents allowing recursive analysis to be run. The result of transformation pipeline analysis may then be modified by results from batch analysis of the data stream 1600 and output in format predesigned by the authors of the analysis with could be human readable summary printout, human readable instruction printout, human-readable raw printout, data store, or machine encoded information of any format known to the art to be used in further automated analysis or action schema.

FIG. 11 is a process flow diagram of a method 1100 for an embodiment of modeling the transformation pipeline module 561 of the invention as a directed graph using graph theory. According to the embodiment, the individual transformations 1102, 1104, 1106 of the transformation pipeline $t_1 \ldots t_n$ such that each $t_i$ T are represented as graph nodes. Transformations belonging to T are discrete transformations over individual datasets $d_i$, consistent with classical functions. As such, each individual transformation $t_j$, receives a set of inputs and produces a single output. The input of an individual transformation $t_i$, is defined with the function in: $t_i \, d_1 \ldots d_k$ such that $in(t_i) = \{d_1 \ldots d_k\}$ and describes a transformation with k inputs. Similarly, the output of an individual transformation is defined as the function out: $t_i$ $[ld_1]$ to describe transformations that produce a single output (usable by other transformations). A dependency function can now be defined such that dep $(t_a, t_b)$ out$(t_a)$ in$(t_b)$ The messages carrying the data stream through the transformation pipeline 1101, 1103, 1105 make up the graph edges. Using the above definitions, then, a transformation pipeline within the invention can be defined as G=(V,E) where message$(t_1, t_2 \ldots t_{(n-1)}, t_n)$V and all transformations $t_1 \ldots t_n$ and all dependencies dep$(t_i,t_j)$E 1107.

FIG. 12 (Prior Art) is a process flow diagram of a method 1200 for one embodiment of a linear transformation pipeline 1201. This is the simplest of configurations as the input stream is acted upon by the first transformation node 1202 and the remainder of the transformations within the pipeline are then performed sequentially 1202, 1203, 1204, 1205 for the entire pipeline with no introduction of new data internal to the initial node or splitting output stream prior to last node of the pipeline 1205. This configuration is the current state of the art for transformation pipelines and is the most general form of these constructs. Linear transformation pipelines require no special manipulation to simplify the data pathway and are thus referred to as non-decomposable. The example depicted in this diagram was chosen to convey the configuration of a linear transformation pipeline and is the simplest form of the configuration felt to show the point. It in no way implies limitation of the invention.

FIG. 13 is a process flow diagram of a method 1300 for one embodiment of a transformation pipeline where one transformation node 1307 in a transformation pipeline receives data streams from two source transformation nodes 1301. The invention handles this transformation pipeline configuration by decomposing or serializing the input events 1302-1303, 1304-1305 heavily relying on post transformation function continuation. The results of individual transformation nodes 1302, 1304 just antecedent to the destination transformation node 1306 and placed into a single specialized data storage transformation node 1303, 1305 (shown twice as process occurs twice). The combined results then retrieved from the data store 1306 and serve as the input stream for the transformation node within the transformation pipeline backbone 1307, 1308. The example depicted in this diagram was chosen to convey the configuration of transformation pipelines with individual transformation nodes that receive input from two source nodes 1302, 1304 and is the simplest form of the configuration felt to show the point. It in no way implies limitation of the invention. One knowledgeable in the art will realize the great number of permutations and topologies possible, especially as the invention places no design restrictions on the number of transformation nodes receiving input from greater than one sources or the number sources providing input to a destination node.

FIG. 14 is a process flow diagram of a method 1400 for one embodiment of a transformation pipeline where one transformation node 1403 in a transformation pipeline sends output data stream to two destination transformation nodes 1401, 1406, 1408 in potentially two separate transformation pipelines. The invention handles this transformation pipeline configuration by decomposing or serializing the output events 1404, 1405-1406, 1407-1408. The results of the source transformation node 1403 just antecedent to the destination transformation nodes 1406 and placed into a single specialized data storage transformation node 1404, 1405, 1407 (shown three times as storage occurs and retrieval occurs twice). The results of the antecedent transformation node may then be retrieved from a data store 1404 and serves as the input stream for the transformation nodes two downstream transformation pipeline 1406, 1408. The example depicted in this diagram was chosen to convey the configuration of transformation pipelines with individual transformation nodes that send output streams to two destination nodes 1406, 1408 and is the simplest form of the configuration felt to show the point. It in no way implies limitation of the invention. One knowledgeable in the art will realize the great number of permutations and topologies possible, especially as the invention places no design restrictions on the number of transformation nodes sending output to greater than one destination or the number destinations receiving input from a source node.

FIG. 15 is a process flow diagram of a method 1500 for one embodiment of a transformation pipeline where the topology of all or part of the pipeline is cyclical 1501. In this configuration the output stream of one transformation node 1504 acts as an input of an antecedent transformation node within the pipeline 1502 serialization or decomposition linearizes this cyclical configuration by completing the transformation of all of the nodes that make up a single cycle 1502, 1503, 1504 and then storing the result of that cycle in a data store 1505. That result of a cycle is then reintroduced to the transformation pipeline as input to the first transformation node of the cycle. As this configuration is by nature recursive, special programming to unfold the recursions was developed for the invention to accommodate it. The example depicted in this diagram was chosen to convey the configuration of transformation pipelines with individual transformation nodes that for a cyclical configuration 1501, 1502, 1503, 1504 and is the simplest form of the configuration felt to show the point. It in no way implies limitation of the invention. One knowledgeable in the art will realize the great number of permutations and topologies possible, especially as the invention places no design restrictions on the number of transformation nodes participating in a cycle nor the number of cycles in a transformation pipeline.

FIG. 16 is a process flow diagram of a method 1600 for one embodiment of the batch data stream analysis pathway which forms part of the invention and allows streaming data to be interpreted with historic context. One or more streams of data from a plurality of sources, which includes, but is in no way not limited to, a number of physical sensors, web based questionnaires and surveys, monitoring of electronic infrastructure, crowd sourcing campaigns, and direct human interaction, is received by the system 1601. The received stream may be filtered 1602 to exclude data that has been corrupted, data that is incomplete or misconfigured and therefore unusable, data that may be intact but nonsensical within the context of the analyses being run, as well as a plurality of predetermined analysis related and unrelated criteria set by the authors. Data formalization 1603 for batch analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The filtered and formalized stream is then added to a distributed data store 1604 due to the vast amount of information accrued over time. The invention has no dependency for specific data stores or data retrieval model. During transformation pipeline analysis of the streaming pipeline, data stored in the batch pathway store can be used to track changes in specifics of the data important to the ongoing analysis over time, repetitive data sets significant to the analysis or the occurrence of critical points of data 1605. The functions of individual transformation nodes 620 may be saved and can be edited also all nodes of a transformation pipeline 600 keep a summary or summarized view (analogous to a network routing table) of applicable parts of the overall route of the pipeline along with detailed information pertaining to adjacent two nodes. This framework information enables steps to be taken and notifications to be passed if individual transformation nodes 640 within a transformation pipeline 600 become unresponsive during analysis operations. Combinations of results from the batch pathway, partial and streaming output results from the transformation pipeline, administrative directives from the authors of the analysis as well as operational status messages from components of the distributed computational graph are used to perform system sanity checks and retraining of one or more of the modules of the system 1606. These corrections are designed to occur without administrative intervention under all but the most extreme of circumstances with deep learning capabilities present as part of the system manager and retrain module 563 responsible for this task.

The skilled person will be aware of a range of possible modifications of the various embodiments described above. Accordingly, the present invention is defined by the claims and their equivalents.

What is claimed is:

1. A distributed computing cluster comprising:
    a first computer system of a first plurality of computer systems, wherein the first computer system is configured to execute software instructions that:
        apply a first transformation pipeline to a first stream of data to generate a first stream of output data, and transmit the first stream of output data to at least one computer system of a second plurality of computer systems, wherein the second plurality of computer systems is distinct from the first plurality of computer systems;
    a second computer system of the second plurality of computer systems, wherein the second computer system is configured to execute software instructions that:
        apply a second transformation pipeline to a second stream of data to generate a second stream of output data, wherein the second transformation pipeline comprises a first storage transformation;
    a third computer system of a third plurality of computer systems, wherein the third computer system comprises a memory, and wherein the third computer system is configured to execute software instructions that:
        store in the memory a representation of a distributed computational graph,
            wherein the representation of the distributed computational graph comprises:
                a representation of at least a portion of the first transformation pipeline,
                a representation of at least a portion of the second transformation pipeline, and
                a representation of at least a portion of a flow of data between the first transformation pipeline and the second transformation pipeline;
        process the representation of the distributed computational graph,
        based at least in part on said processing, determine whether the second transformation pipeline includes a storage transformation,
        monitor said applying of the second transformation pipeline, and
        in response to said monitoring, cause a fourth computer system of the third plurality of computer systems to execute software instructions that apply a second storage transformation.

2. The distributed computing cluster of claim 1, wherein the second transformation pipeline further comprises a first transformation,
    wherein the first transformation processes data stored by the first storage transformation; and,
wherein the third computer system is further configured to execute software instructions that:
    in response to said monitoring, cause the fourth computer system to execute software instructions that apply a second transformation,
        wherein the second transformation processes data stored by the second storage transformation.

3. The distributed computing cluster of claim 2, wherein said causing the fourth computer system to execute software instructions that apply the second transformation comprises:
    processing the representation of the distributed computational graph to determine a configuration of the first transformation, and
    transmitting to the fourth computer system information describing a portion of the configuration.

4. The distributed computing cluster of claim 1,
wherein the second transformation pipeline further comprises a first transformation,
    wherein the first storage transformation stores data processed by the first transformation; and,
wherein the third computer system is further configured to execute software instructions that:
    in response to said monitoring, cause the fourth computer system to execute software instructions that apply a second transformation,
        wherein the second storage transformation stores data processed by the second transformation.

5. The distributed computing cluster of claim 4, wherein said causing the fourth computer system to execute software instructions that apply the second transformation comprises:
processing the representation of the distributed computational graph to determine a configuration of the first transformation, and
transmitting to the fourth computer system information describing a portion of the configuration.

6. The distributed computing cluster of claim 1, wherein the second stream of data comprises at least a portion of the first stream of output data.

7. The distributed computing cluster of claim 1, wherein said monitoring said applying the second transformation pipeline commences at least in part before said determining whether the second transformation pipeline includes at least a storage transformation.

8. The distributed computing cluster of claim 1, wherein said monitoring said applying the second transformation pipeline commences at least in part before said processing the representation of the distributed computational graph.

9. The distributed computing cluster of claim 1, wherein the at least one computer system of the second plurality of computer systems is the same computer system as the second computer system.

10. A distributed computing network comprising:
a first plurality of computer systems,
wherein each respective computer system of the first plurality of computer systems comprises a respective memory that stores a respective first data,
wherein the respective first data represents a respective portion of a first distributed computational graph, and
wherein the first distributed computational graph describes a first transformation pipeline; and,
wherein each respective computer system of the first plurality of computer systems is configured to:
receive a respective first stream of data from a feed,
process the respective first stream of data substantially in real time by executing respective software instructions that apply the first transformation pipeline to the respective first stream of data to generate a respective second stream of data, and
transmit the respective second stream of data to another computer system of the first plurality of computer systems, wherein the another computer system of the first plurality of computer systems is identified based on the first distributed computational graph;
a second plurality of computer systems distinct from the first plurality of computer systems, wherein each respective computer system of the second plurality of computer systems comprises a respective memory that stores a respective second data, and
a monitoring computer system that is part of either the first plurality of computer systems or the second plurality of computer systems, and wherein the monitoring computer system is configured to execute software instructions that:
monitor the execution of the first transformation pipeline,
in response to the monitoring, retrieve a representation of at least a portion of a second distributed computational graph, wherein the representation describes a flow of data from the first transformation pipeline to a second transformation pipeline,
process the representation, and
in response to the processing, cause at least one respective computer system of the second plurality of computer systems to process substantially in real time at least a respective portion of a third stream of data by applying the second transformation pipeline to the respective portion of the third stream of data, wherein the third stream of data comprises at least a portion of at least one of the respective second streams of data.

11. The distributed computing network of claim 10, wherein at least one of the first transformation pipeline and the second transformation pipeline is non-linear.

12. The distributed computing network of claim 11, wherein the identified at least one respective computer system of the second plurality of computer systems is not configured to apply the second transformation pipeline to any stream of input data.

13. The distributed computing network of claim 11, wherein the monitoring computer system is further configured to execute software instructions that:
identify one or more of the respective memories that store the respective first data representing at least a respective portion of the distributed computational graph, wherein the respective first data includes information about the first transformation pipeline,
and store in the identified one or more memories information identifying at least one respective computer system of the second plurality of computer systems.

14. The distributed computing network of claim 10, wherein the monitoring computer system is further configured to execute software instructions that:
identify one or more of the respective memories that store the respective first data representing at least a respective portion of the first distributed computational graph, wherein the respective first data includes information about the second transformation pipeline,
and store in the identified one or more memories information identifying the another computer system of the first plurality of computer systems.

15. The distributed computing network of claim 10, wherein the second plurality of computer systems are not executing any portion of any transformation pipeline in the flow of any of the distributed computational graphs.

16. The distributed computing network of claim 11, wherein the second plurality of computer systems are not executing any portion of any transformation pipeline in the flow of any of the distributed computational graphs.

* * * * *